US009680902B2

(12) United States Patent
Yu

(10) Patent No.: US 9,680,902 B2
(45) Date of Patent: Jun. 13, 2017

(54) MEDIA STREAMING METHOD AND DEVICE USING THE SAME

(71) Applicant: Industrial Technology Research Institute, Hsinchu (TW)

(72) Inventor: Yun-Shuai Yu, Changhua County (TW)

(73) Assignee: Industrial Technology Research Institute, Hsinchu (TW)

( * ) Notice: Subject to any disclaimer, the term of this patent is extended or adjusted under 35 U.S.C. 154(b) by 642 days.

(21) Appl. No.: 13/938,245

(22) Filed: Jul. 10, 2013

(65) Prior Publication Data

US 2014/0173055 A1     Jun. 19, 2014

(30) Foreign Application Priority Data

Dec. 17, 2012  (TW) .............................. 101147905 A

(51) Int. Cl.
H04L 29/06     (2006.01)

(52) U.S. Cl.
CPC ............ *H04L 65/607* (2013.01); *H04L 65/80* (2013.01); *H04L 65/602* (2013.01)

(58) Field of Classification Search
CPC .................................................. H04L 65/607
See application file for complete search history.

(56) References Cited

U.S. PATENT DOCUMENTS

| | | | |
|---|---|---|---|
| 6,747,991 B1 | 6/2004 | Hemy et al. | |
| 7,574,726 B2 | 8/2009 | Zhang et al. | |
| 7,965,771 B2 | 6/2011 | Wu et al. | |

(Continued)

FOREIGN PATENT DOCUMENTS

| | | |
|---|---|---|
| TW | 525387 | 3/2003 |
| TW | 200607280 | 2/2006 |
| TW | 201044868 | 12/2010 |
| TW | I361622 | 4/2012 |
| TW | 201230850 | 7/2012 |

OTHER PUBLICATIONS

Park et al., "A Cross-Layered Network-Adaptive HD Video Streaming in Digital A/V Home Network: Channel Monitoring and Video Rate Adaptation", IEEE Transactions on Consumer Electronics, Nov. 2006, vol. 52, p. 1245-p. 1252.

(Continued)

*Primary Examiner* — Nicholas Taylor
*Assistant Examiner* — Sanjoy Roy
(74) *Attorney, Agent, or Firm* — Jianq Chyun IP Office

(57) ABSTRACT

A media streaming method and a device using the same are introduced herein. The disclosure introduces a method for smooth and flawless playback of live media streaming in dynamic network environment. When network congestion occurs for a period, a media receiver may play media data as more as possible by adjusting the transmission order of media data meaningful to the receiver or a provider for providing the media data. In one embodiment, the disclosure introduces a method for smooth and flawless playback of live media streaming by caching a certain amount of media data and then playing them at an appropriate speed to catch up to the progress of the live media streaming, or by dynamically changing bit rates of the live media streaming in time by the provider to meet the most acceptable bit rate according to the network environment between the provider and the receiver.

24 Claims, 20 Drawing Sheets

(56) References Cited

U.S. PATENT DOCUMENTS

| | | | |
|---|---|---|---|
| 7,996,872 B2 | 8/2011 | Levy et al. | |
| 8,099,755 B2 | 1/2012 | Bajpai et al. | |
| 2005/0254499 A1* | 11/2005 | Leon | H04L 29/06027 370/394 |
| 2006/0126713 A1* | 6/2006 | Chou | H04L 47/10 375/225 |
| 2007/0168541 A1* | 7/2007 | Gupta | G06Q 30/0242 709/231 |
| 2008/0198929 A1* | 8/2008 | Fujihara | H04N 19/00054 375/240.13 |
| 2008/0273533 A1* | 11/2008 | Deshpande | H04L 12/5693 370/392 |
| 2010/0333148 A1* | 12/2010 | Musha | H04N 21/23406 725/81 |
| 2011/0202674 A1 | 8/2011 | Su et al. | |
| 2011/0299399 A1 | 12/2011 | Egan et al. | |

OTHER PUBLICATIONS

Ahmed et al., "Adaptive Packet Video Streaming Over IP Networks: A Cross-Layer Approach", IEEE Journal on Selected Areas in Communications, Feb. 2005, vol. 23, p. 385-p. 401.

Hemy et al., "Evaluation of Adaptive Filtering of MPEG System Streams in IP Networks", 2000 IEEE International Conference on Multimedia and Expo, Aug. 2000 , vol. 3, p. 1313-p. 1317.

Huo et al., "Network Adapted Selective Frame-Dropping Algorithm for Streaming Media", IEEE Transactions on Consumer Electronics, May 2007, vol. 53, p. 417-p. 423.

Ahn et al., "Network Condition Adaptive Real-time Streaming of an Intelligent Ubiquitous Middleware for U-city", Proceedings of the 4th International Conference on Ubiquitous Information Technologies & Applications, Dec. 2009 , p. 1-p. 5.

Isovi'c et al., "Quality aware MPEG-2 Stream Adaptation in Resource Constrained Systems", 16th Euromicro Conference on Real-Time Systems, Jul. 2004 , p. 23-p. 32.

Kotra et al., "Resource Aware Real-Time Stream Adaptation for MPEG-2 Transport Streams in Constrained Bandwidth Networks", 2010 IEEE International Conference on Multimedia and Expo, Jul. 2010, p. 729-p. 730.

Kotra et al., "Resource aware real-time stream adaptation of MPEG-4 video in constrained bandwidth networks", 2011 IEEE Visual Communications and Image Processing, Nov. 2011, p. 1-p. 4.

"Office Action of Taiwan Counterpart Application", issued on Jun. 4, 2015, p. 1-p. 6.

* cited by examiner

| | nI | n+3P | n+1B | n+2B | n+6P | n+4B | n+5B | n+9P | n+7B | n+8B |
|---|---|---|---|---|---|---|---|---|---|---|
| Playback time (s) | 10.0 | 10.3 | 10.1 | 10.2 | 10.6 | 10.4 | 10.5 | 10.9 | 10.7 | 10.8 |
| Size (kb) | 800 | 200 | 116 | 84 | 200 | 84 | 116 | 200 | 100 | 100 |
| Transmission time (s) | 0.5 | 0.125 | 0.0725 | 0.0525 | 0.125 | 0.0525 | 0.0725 | 0.125 | 0.0625 | 0.0625 |
| Latest start download time | 9.5 | 10.175 | 10.0275 | 10.1475 | 10.1475 | 10.3475 | 10.4275 | 10.775 | 10.6375 | 10.7375 |

MEDIA STREAMING METHOD AND DEVICE USING THE SAME

CROSS-REFERENCE TO RELATED APPLICATION

This application claims the priority benefit of Taiwan application serial no. 101147905, filed on Dec. 17, 2012. The entirety of the above-mentioned patent application is hereby incorporated by reference herein and made a part of this specification.

BACKGROUND

Technical Field

The disclosure is related to a media streaming method and a device using the same.

Related Art

In recent years, people are used to watch live media stream, such as live broadcast of a major competition or show, road or building monitoring, live playback of captured game images, distant education, online live news, live broadcast of a disaster and so on. Due to the variety characteristics of a network, a media receiver uses a data buffer to store media data having time lengths from hundreds of milliseconds to seconds so as to mitigate playback discontinuity due to the network delay and jitter. However, such a simple solution can not make the live media stream to get adapted to changes in the network. When network congestion occurs for a long period that the data in the buffer is exhausted, a typical player in the media receiver reacts in two ways as follows. One of the reactions is not to give up any data which is not yet played back, but temporarily pause until a certain data amount appears in the buffer again. However, a result of a lager lag between the watching progress and the current progress occurs. Another reaction is to discard any data which is received at a time exceeds the playback time; however, this will result in following frames being incorrectly presented.

In order to solve the above problems, many solutions have been proposed in last ten years. One of the solutions called bitstream switch gradually tends to become a trend, by which a video is encoded into several streams at different bit rates. Note that those streams are independent of each other. The media receiver selects a highest bit rate to watch from the bit rates, which is under an available bandwidth according to his/her own network environment at an appropriate time point. This solution has an advantage that the media provider merely has to compress a video into a limited number (commonly 3~5) of streams with different bit-rates which most users are interested in or able to receive and thus, will not result in heavy burden to the media provider. Additionally, in most cases, the watching quality that the media receiver can get is also almost close to the optimal quality that can be achieved in the network environment.

Currently on the market, at least two freeware is available for providing the function of producing streams of different bit rates. One of them is a software named "Flash Media Live Encoder" (referred to as FMLE) of Adobe®. Through this software, data transmitted from a webcam may be compressed as media streams of three bit rates and sent via a real-time messaging protocol (RTMP). The image compression format is VP6 or H.264, and the audio compression format is mp3 or NellyMoser. Another software is the open-source "FFMpeg". The software may transfer an original media streaming into a numerous number (depending on hardware capability) of media streams which support most well-known compression formats, and these media streams can be sent via at least RTP, LiveFLV, or RTMP protocols). Moreover, on may well-known video-sharing platforms, such as Youtube® and Youku®, most videos have several types of playback quality for selection. Currently, the video programs available on theses platforms are not live but pre-recorded. However, people have been very used to such usage mode and certainly, expect live media-sharing platforms to provide media streams of different playback quality in the future.

However, the users should not switch between streams at an arbitrary time due to the following reasons. First, network conditions may change dramatically over a short period of time. If the bitstream switch operation reacts too aggressively based on the transient network conditions, it may cause undesirable temporary fluctuations in the use of bandwidth. Eventually, the throughput of the streaming flows deteriorates sharply and it can incur noticeable damage to the streaming quality. Thus, to confirm the network becomes stable, the users should adopt existing bandwidth estimation algorithms which can avoid the effect of the transient changes. Besides, the commonly used image compression algorithms (the H.264, the Mpeg 2 and 4 standards) define three types of frames, i.e. I, P and B frames, for example, to present data, and the P-frames or the B-frame have to directly or indirectly refer to the latest I-frames. Thus, the time point of the bitstream switch operation is limited by the time point where the I-frames appear, which leads to two functional demands. One is to provide an acceptable watching quality before the switch, and the other one is to assist the user under stable network condition to switch as soon as possible.

In summary, several trends of users' habits can be observed according to the current technique, which are as follows. (1) More and more users turn to use a tablet PC or a smart phone to watch media streaming; however, such apparatuses have limited computation capability and power. (2) Usually, a popular program may be watched by hundreds or thousands of users. (3) The peer-to-peer (P2P) architecture becomes more and more popular, and in a P2P system, each user would like to share media streaming with others. These trends of usage habits result in two demands in performance. Namely, the computation demand should not overwhelm the mobile devices and the network bandwidth demand should keep as small as possible.

SUMMARY

The disclosure is related to a live media streaming system and a method thereof adapted to dynamic network environment.

According to an embodiment, a live media streaming method is introduced. The method includes the following steps. Streaming data is received and a plurality of encoded data obtained therefrom and temporarily stored therein is monitored. Each of the temporarily stored encoded data includes a plurality of encoding-decoding units transmitted based on a transmission order. In an embodiment, the encoded data may include media data or only image data.

In the live media streaming method, when the streaming quality requires to be adjusted, information of the encoded data is obtained, importance parameters corresponding to the encoding-decoding units contained in each of the encoded data are obtained based on the information of the encoded data and an transmission order of the encoding-decoding units contained in each of the following encoded data transmitted in a media streaming channel is adjusted according to the corresponding importance parameters.

In an embodiment, the adjustment of the transmission order of the encoding-decoding units based on the temporarily stored encoded data includes the following steps. Determine the amount of the encoded data is lower than a first threshold or higher than a second threshold, wherein the second threshold is higher than the first threshold. When the amount of the encoded data is lower than the first threshold, information of the encoded data is obtained, the importance parameters corresponding to the encoding-decoding units contained in each of the encoded data are obtained based on the information of the encoded data, and the transmission order of the encoding-decoding units of the following encoded data transmitted via a media streaming channel is adjusted based on the importance parameters. When the amount of the encoded data is higher than the second threshold, the adjustment of the transmission order is stopped.

According to an embodiment, a media streaming method is introduced. The method includes the following steps. Streaming data are received and multiple encoded data are obtained therefrom. The temporarily stored encoded data are transmitted to a player for display. Whether the amount of the stored encoded data is lower than a first threshold is determined. When the amount of the encoded data is lower than the first threshold or exhausted, the transmission is stopped for a first time interval and the encoded data received within the first time interval is temporarily stored. The encoded data having playback time within the first time interval is adjusted to be played back at an accelerated speed so as to complete playing back within a second time interval, wherein the second time interval is smaller than the first time interval. When the amount of the encoded data is higher than a second threshold, the normal playback speed is resumed. In an embodiment, the encoded data may include media data or only image data.

According to an embodiment, a media streaming method is introduced. The method includes the following steps. First, streaming data is received at a first bit rate. Second streaming data received at a second bit rate is switched to at a switch time. The switch time is determined according to a current playback time, a playback time of a first important encoding-decoding unit and a playback time of a second important encoding-decoding unit, the playback time of the first important encoding-decoding unit is a playback time of the newest important encoding-decoding units in a plurality of encoded data of the second streaming data having the earlier playback time than the current playback time, the playback time of the second important encoding-decoding unit is a playback time of the oldest important encoding-decoding units in a plurality of encoded data of the second streaming data having the later playback time than the current playback time. The importance parameters corresponding to the encoding-decoding units contained in each of the encoded data are obtained based on the information of the encoded data. In an embodiment, the encoded data may include media data or only image data.

According to an embodiment, a media streaming device adapted to receiving a plurality of encoded data from streaming data is introduced. Each of the encoded data includes a plurality of encoding-decoding units, and the plurality of encoding-decoding units is transmitted according to an encoding order. The encoded data comprises media data or only image data. The media streaming device includes a buffer, a buffer monitor and a frame demander. The buffer monitor configured to monitor an amount of the encoded data temporarily stored in the buffer. When the amount of the plurality of encoded data is lower than a first threshold, an adjustment signal is transmitted. When the amount of the plurality of encoded data is higher than a second threshold, an adjustment stop signal is transmitted. The frame demander outputs a frame request signal in response to the adjustment signal so as to adjust the transmission order of the encoding-decoding units of the encoded data in the streaming data.

In an embodiment, the media streaming device further includes a timestamp regulator configured to receive the downloaded encoded data and temporarily stores the encoded data in the buffer and modifies the playback time of a portion of the encoded data.

In an embodiment, the media streaming device further includes a stream demander outputting a bit rate request signal in response to the adjustment signal and a bandwidth estimation result to provide information of the encoded data for receiving another streaming data of a different bit rate.

In an embodiment, the media streaming device further includes an uploader and a scheduler. The uploader is configured to transmit the encoded data received from the streaming data. The scheduler is configured to receive another frame request signal from the external. Another frame request signal includes importance parameters corresponding to the encoding-decoding units contained in each of the encoded data transmitted from the uploader. The importance parameters are obtained according to the information of the encoded data. The scheduler adjusts a transmission order of the encoding-decoding units contained in the encoded data transmitted from the uploader according to the importance parameters.

The media streaming device further includes a timestamp regulator and a timestamp restorer. The timestamp regulator is configured to receive the downloaded encoded data, temporarily store the encoded data in the buffer and modify the playback time of a portion of the encoded data. The timestamp restorer is connected to the timestamp regulator and configured to restore the modified playback time to adapt to a timestamp of media streaming information to be used by a media receiver at a next stage.

In another embodiment, the media streaming device further includes a stream demander and a switcher. The stream demander outputs a bit rate request signal in response to the adjustment signal and a signal form a bandwidth estimator to provide information of the encoded data for receiving another streaming data of a different bit rate. The switcher is configured to receive another bit rate request signal from the external, switch from first streaming data having a first bit rate, which is outputted from the uploader, to second streaming data having a second bit rate and determine a suitable playback time point of the second stream to start the transmission.

In an embodiment, the media streaming device further includes a timestamp regulator, a timestamp restorer, an uploader and a scheduler. The timestamp regulator is configured to receive the downloaded encoded data, temporarily store the encoded data in the buffer and modify the playback time of a portion of the encoded data. The timestamp restorer is connected to the timestamp regulator and configured to restore the modified playback time to adapt to a timestamp of media streaming information to be used by a media receiver at a next stage. The uploader is connected to the timestamp restorer and configured to transmit the encoded data received from the streaming data. The scheduler is configured to receive another frame request signal from the external. The another frame request signal includes importance parameters corresponding to the encoding-decoding units contained in each of the encoded data transmitted from the uploader. The importance parameters are calculated and obtained according to the information of the encoded data. The scheduler adjusts a transmission order of the encoding-decoding units contained in each of the encoded data transmitted from the uploader according to the importance parameters.

According to an embodiment, a media streaming device adapted to receiving a plurality of encoded data from streaming data is introduced. Each of the encoded data includes a plurality of encoding-decoding units, and the encoding-decoding units are transmitted based on an encoding order. The encoded data includes media data or only image data. The media streaming device includes a buffer, a buffer monitor, a timestamp regulator, a frame demander, a stream demander, a timestamp restorer, an uploader, a scheduler and a switcher. The buffer monitor is configured to monitor an amount of the encoded data temporarily stored in the buffer. When the amount of the encoded data is lower than a first threshold, an adjustment signal is transmitted. When the amount of the encoded data is higher than a second threshold, an adjustment stop signal is transmitted. The timestamp regulator is configured to receive the downloaded encoded data, temporarily store the encoded data in the buffer and modify the playback time of a portion of the encoded data. The frame demander outputs a frame request signal in response to the adjustment signal so as to adjust the transmission order of the encoding-decoding units of the encoded data in the streaming data. The stream demander outputs a bit rate request signal in response to the adjustment signal and a bandwidth estimation result to provide information of the encoded data for receiving another streaming data of a different bit rate. The timestamp restorer is connected to the timestamp regulator and configured to restore the modified playback time to adapt to a timestamp of media streaming information to be used by a media receiver at a next stage. The uploader is connected to the timestamp restorer and configured to transmit the encoded data received from the streaming data. The scheduler is configured to receive another frame request signal from the external. The another frame request signal includes importance parameters corresponding to the encoding-decoding units contained in each of the encoded data transmitted from the uploader. The importance parameters are calculated and obtained according to the information of the encoded data. The scheduler adjusts a transmission order of the encoding-decoding units contained in each of the encoded data transmitted from the uploader according to the importance parameters. The switcher is configured to receive another bit rate request signal from the external, switch from outputting first streaming data having a first bit rate to outputting second streaming data having a second bit rate and determine a suitable playback time point of the second stream to start the transmission.

According to an embodiment, a media streaming device including an uploader, a scheduler and a switcher is introduced. The uploader is configured to transmit first streaming data having a first bit rate, where in the first streaming data comprises a plurality of encoded data, each of the encoded data comprises a plurality of encoding-decoding units and the plurality of encoding-decoding units is sorted according to a transmission order. The encoded data includes media data or only image data. The scheduler is configured to receive a frame request signal and adjusts the transmission order of the encoding-decoding units contained in each of the encoded data transmitted from the uploader according to the frame request signal. The switcher is configured to receive another bit rate request signal from the external, switch the uploader from outputting the first streaming data having the first bit rate to outputting second streaming data having a second bit rate and determine a suitable playback time point of the second stream to start the transmission.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
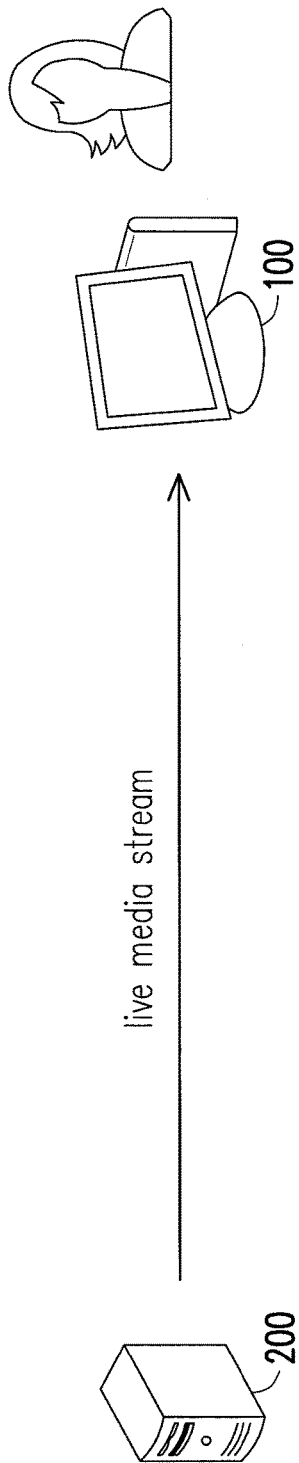
FIGS. 1A and 1B are schematic diagrams illustrating configurations of a live media streaming system adapted to network bandwidths according to different embodiments of the disclosure.

A live media streaming system adapted to network bandwidths and a method thereof are introduced in the disclosure. Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

In one of embodiments of the disclosure, by the live media streaming system adapted to the network bandwidths and the method thereof, when network congestion occurs for a period, a media receiver may smoothly and flawless plays back media data as many as possible, or play the media data meaningful to a media provider or the media receiver while a playback time difference of the newest media data played by the media receiver and the newest media data provided by the media provider can be kept within a certain range.

In one of the embodiments of the disclosure, by the live media streaming system adapted to the network bandwidths and the method thereof, when another stream of a different bit rate exists in the media streaming system, a media receiver may switch to a stream of a highest bit rate which does not exceed his/her available bandwidth.

According to one of the embodiments, a live media stream system and a method thereof adapted to a dynamic network environment is introduced by the disclosure. The disclosure not only incurs slight computation burdens, but also avoids redundant data for saving bandwidth. In some researches, a method of adding I-frames is adopted, but results in increased redundant media data. In some other researches, a FEC or a MDC encoding method is adopted, but results in increased redundant data and calculation burdens.

A live media streaming system and a method thereof adapted to a dynamic network environment is introduced by the disclosure, which is applicable to an environment where a user would like to keep up with the latest playback progress. For example, in a portion of embodiments, the system and the method is applicable to road or building monitoring or live broadcast of a disaster, live broadcasting which requires interaction between media receivers or between a media receiver and a provider (such as a call-in show, distant education, a shopping program or a video conference).

A live media streaming system and a method thereof adapted to a dynamic network environment is introduced by the disclosure, which is applicable to a media receiver having limited hardware capability (e.g. a handheld device), a media provider having limited resource (e.g. a limited number of servers to serve as more as possible clients) or a peer-to-peer (P2P) architecture where each peer is also a media provider.

A live media streaming system and a method thereof adapted to a dynamic network environment is introduced by the disclosure. In an embodiment, one or more media providers and one or more media receivers are included, which is also referred to as client/server architecture. In another embodiment, the media receiver of the system may also be the media provider at the same time, i.e. each peer under the P2P architecture.

In the system and method introduced in the disclosure, the network condition may be classified into four types as follows:
1. A congestion-data insufficiency condition: The available bandwidth of the network is lower than the bit rate, such that data amount temporarily stored in the buffer of the media receiver is lower than a threshold.
2. A congestion-data exhaustion condition: The available bandwidth of the network is lower than the bit rate for a relative long period of time, such that data amount temporarily stored in the buffer of the media receiver is exhausted.
3. A switch to low bit rate condition: The duration which the available bandwidth of the network is lower than the bit rate exceeds a threshold, and the network condition is considered to be stable enough for switching to a stream having a lower bit rate.
4. A switch to high bit rate condition: The duration which the available bandwidth of the network is higher than the bit rate exceeds the threshold, and the network condition is considered to be stable enough for switching to a stream having a higher bit rate.

The four types of network conditions may be referred to as the events that the transmission needs to be adjusted. Once the event occurs, one or more live media streaming methods adapted to the dynamic network environment introduced by the disclosure may be used to achieve a more smooth and flawless playback effect. In one or more live media streaming methods adapted to the dynamic network environment introduced by the disclosure, a method of downloading according to importance order, a method of quick playback and a method of switching bit rate may be adopted, or one of the three methods or a combination of a part thereof may be adopted according to designing requirements.

In the below embodiments, different combinations of the methods may be adopted in the different network conditions:
1. Under the congestion-data insufficiency condition, the method of downloading according to the importance is adopted to adjust the transmission order of media data.
2. Under the congestion-data exhaustion condition, the media receiver pauses for a short period of time and simultaneously downloads the important data by using the method of downloading according to importance, and then quickly plays the above important data with the method of quick playback so as to keep up with the progress of the live time.
3. Under the switching to low bit rate condition, a feasible immediately switch method is adopted to determine whether the network condition is suitable for a media receiver to switch to a playback time before the first I-frame of a new stream which appears after the current playback progress. If it is suitable, the required data in the new stream is downloaded by adopting the method of downloading according to importance and quickly play back and then, the normal playback mode is switched back. Otherwise, the original stream continues to be played back by adopting the method of downloading according to importance and the method of quick playback, and the new stream is switched to in the playback time of the first I-frame of the new stream after the current playback progress.
4. Under the switching to high bit rate condition, the operation is basically same as the operation under the switching to low bit rate condition.

In the live media streaming system and a method thereof adapted to a dynamic network environment introduced by the disclosure, the image compressed data transmitted by the system is applicable to the compressed data having the following features. For example, in the compressed data, a part of the data may by decompressed based on only its own information, while the remaining data further requires information other than itself so as to be decompressed. Compression algorithms conforming to the aforementioned features include the Motion Picture Experts Group (MPEG) series of the International Standard Organization (ISO), the H.264 standard and the high efficiency video coding (HEVC). The H.264 standard is contained in the tenth part (ISO/IEC 14496-10) of the MPEG-4 standard in the ISO and named as the advanced video coding (AVC) and collective referred to as H.264/AVC. The HEVC is a standard co-developed by the ISO/IEC MPEG and the ITU-T VCEG and considered as a successor of the H.264/AVC, which is expected to be one of the popular video coding standards in the future.

For descriptive convenience, only I-frames, P-frames and B-frames are adopted in the below description. However, I, P and B slices used in the H.264 standard or any other unit used for encoding/decoding videos is applied to the system and/or the method introduced by the disclosure.

Figure 1B:
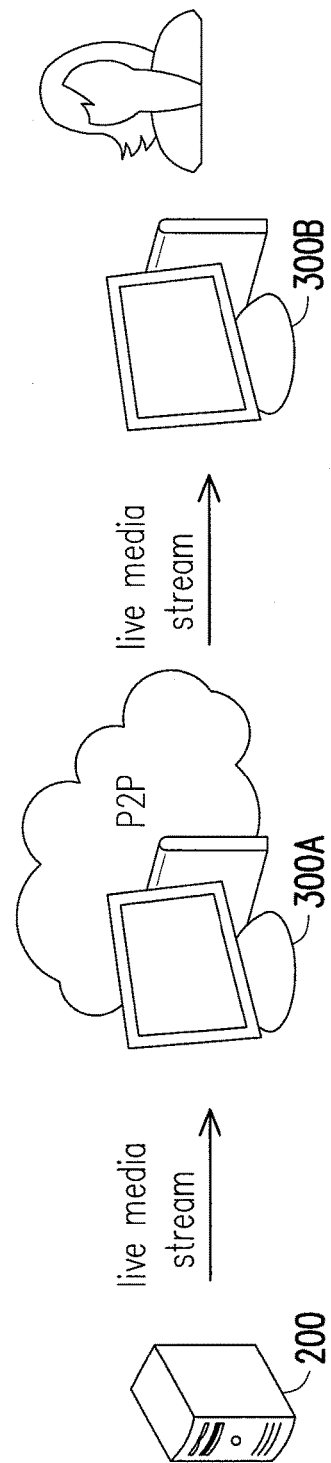

FIGS. 1A and 1B are schematic diagrams illustrating architectures of a live media streaming system adapted to network bandwidths according to different embodiments of the disclosure. In one of the embodiments, as shown in FIG. 1, the live media streaming system introduced by the disclosure may be applied in a client/server architecture. Here, the server 200 is configured to provide a live media stream to a client 100. The server 200 provides the media stream to the client 100 which desires to keep up with the latest progress but has limited network transmission capability. Accordingly, as long as the live media stream may be transmitted to the client 100 within a time period as required by the system, the live status or nearly live status as mentioned in the present embodiment of the disclosure may be conformed. For example, where a time period from a media stream is generated at a source to being transmitted to the client 100 is within, for example, 10 seconds or 20 seconds, may be referred to as conforming to the live status or nearly live status, but the disclosure is not limited thereto, and the status is mainly based on the requirement of the system. For example, responding time periods required for events, such as road or building monitoring or live broadcast of a disaster vary with actual conditions.

In another one of the embodiments, as shown in FIG. 1B, the live media streaming system introduced by the disclosure may be applied to a peer-to-peer (P2P) architecture. Here, the server 200 provides a live media stream to a client 300A, and the client 300A may be a peer in the P2P architecture. And another media receiver, such as a client 300B in FIG. 1B, may download media data from one or more media receivers, e.g. the client 300A, to obtain the live media stream. In the P2P architecture, each media receiver may also further provide media data which is temporarily stored therein to one or more media receivers.

Figure 2A:
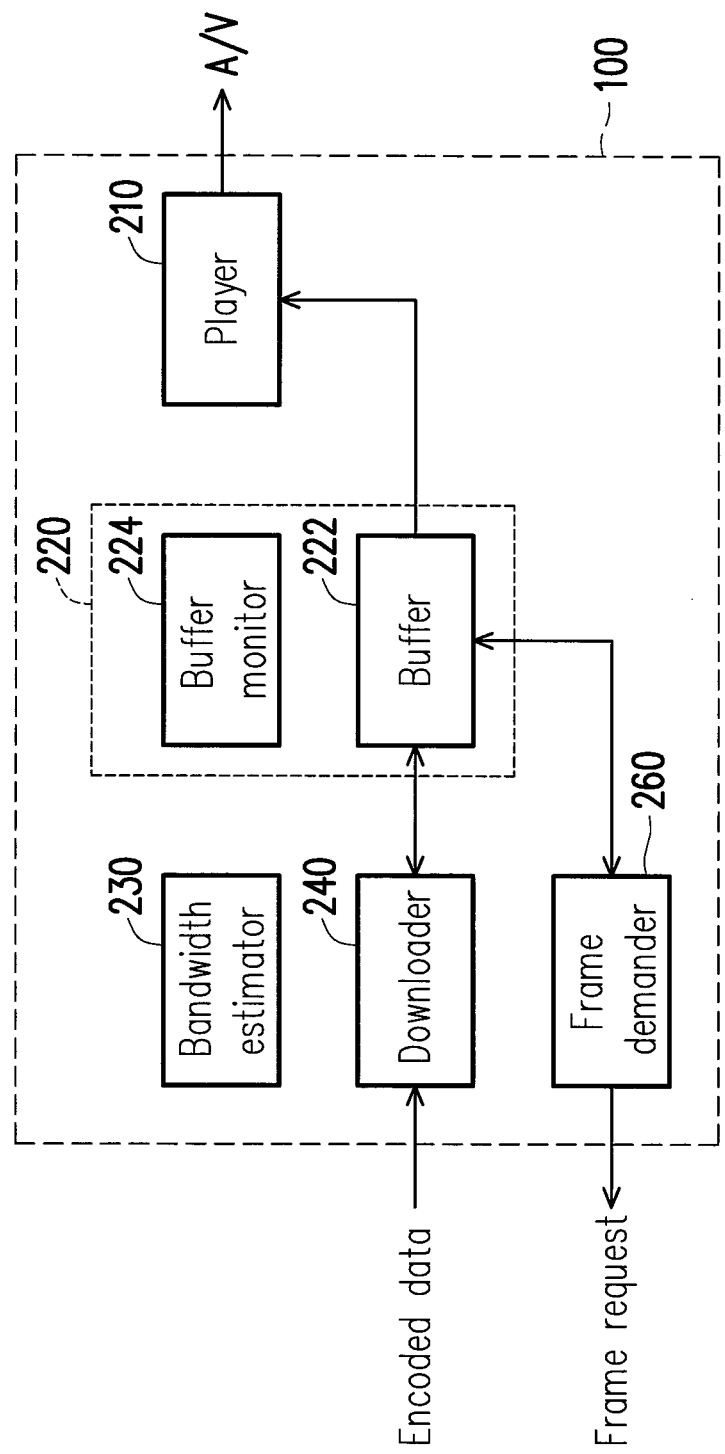
FIGS. 2A~2C are schematic block diagrams illustrating systems used in client hosts of the live media streaming system according to a plurality of embodiments of the disclosure.
Figure 2B:
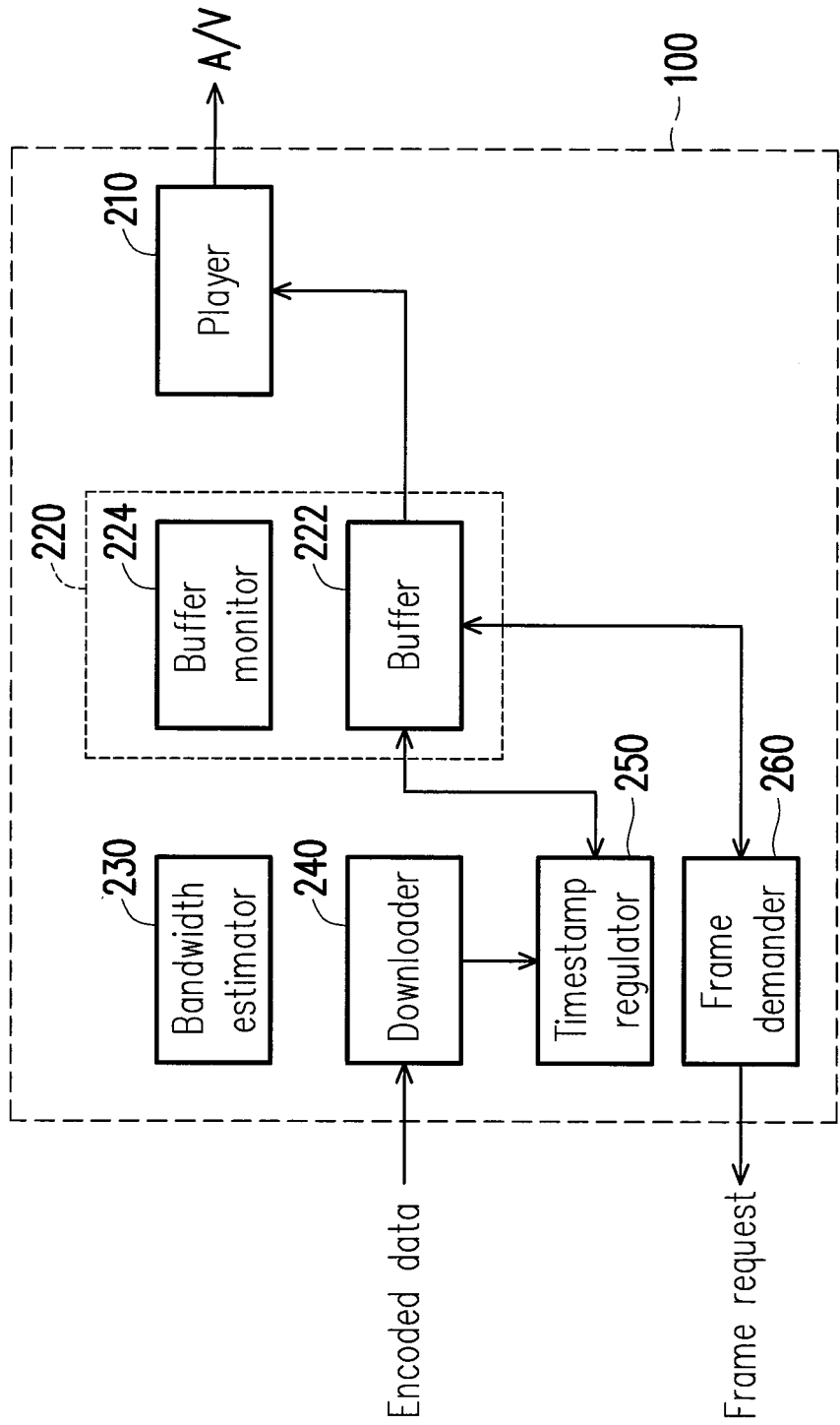
Figure 2C:
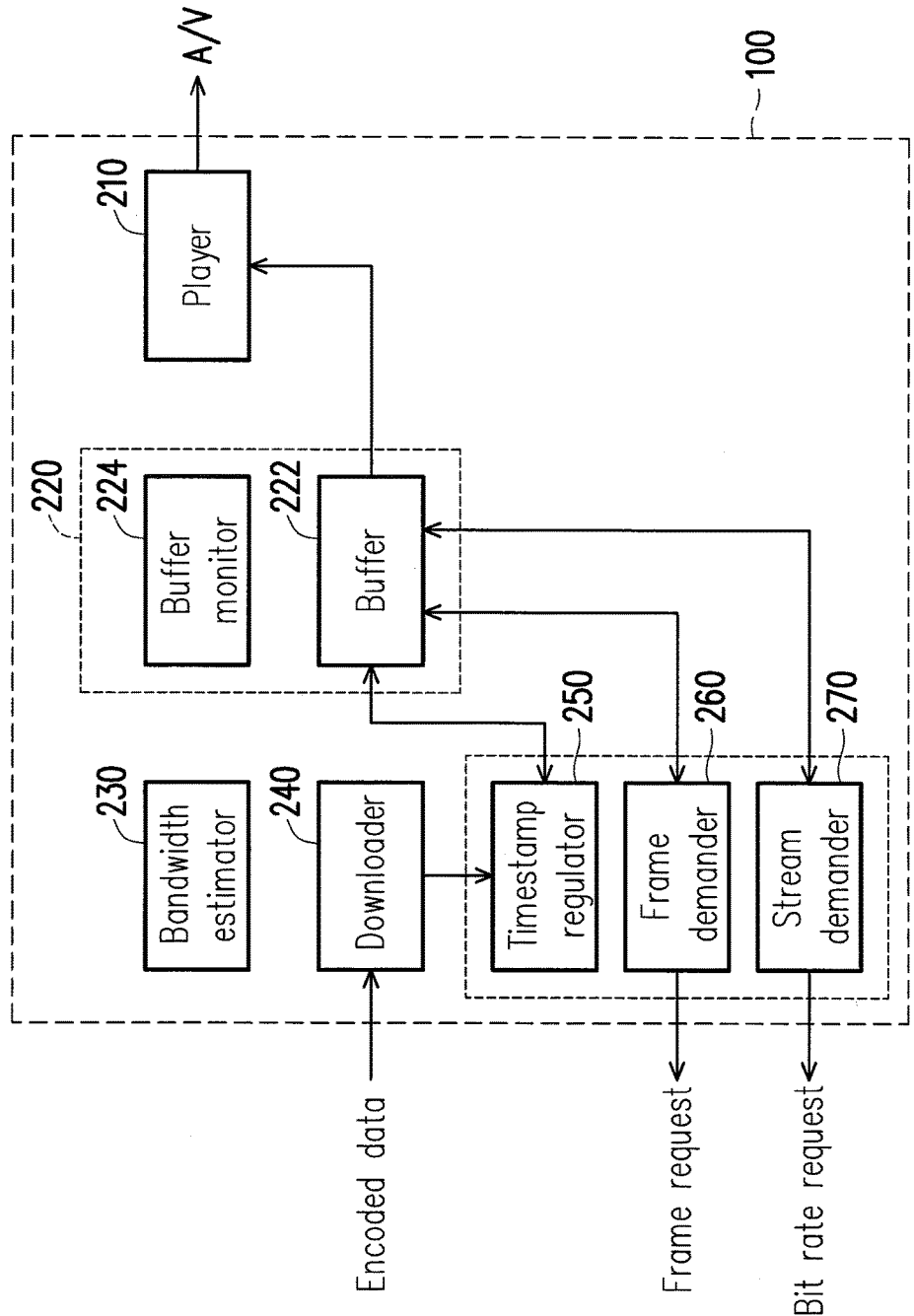

FIGS. 2A~2C are schematic block diagrams illustrating systems used in clients of the live media streaming system according to a plurality of embodiments of the disclosure, but the disclosure is not limited thereto.

With reference to FIG. 2A, a schematic block diagram of a system used in a client of the live media streaming system according to one of the embodiments is illustrated. Here, a client 100 includes a player 210, a buffer unit 220, a bandwidth estimator 230 and a downloader 240, and a system used in the client 100 for achieving the live media streaming system introduced by the disclosure also includes a frame demander 260.

The system used in the client 100 may be implemented by individual physical elements, firmware or software modules stored in a memory device for being executed by a processor. Each of the aforementioned manners may achieve the live media streaming system introduced by the disclosure. The downloader 240 is configured to receive encoded data and transmit the same to the buffer unit 220, and the buffer unit 220 is connected to the player 210 and the frame demander 260.

The player 210 may be a commonly used player available in the market, such as a flash player, or a customized player and is configured to play audio/video (A/V) data. The buffer unit 220 is a temporarily storage unit located in the external of the player 210 and configured to store media data, such as media data with real-time messaging protocol (RTMP) information, to be provided to the player 210. The buffer unit 220 includes a buffer 222 and a buffer monitor 224. The buffer monitor 224 is configured to monitor whether the amount of data stored in the buffer 222 is insufficient. The bandwidth estimator 230 estimates an available bandwidth between a current media provider and the client and a bandwidth between any other possible media provider and the client by utilizing a bandwidth estimation mechanism. The downloader 240 is configured to download the media data. The frame demander 260 transmits a frame request to the media provider and provides required information to the media provider to request for a change of a media data transmission priority.

With reference to FIG. 2B, a schematic block diagram of a system used in a client of the live media streaming system according to one of the embodiments is illustrated. Here, a client 100 includes a player 210, a buffer unit 220, a bandwidth estimator 230 and a downloader 240, and a system used in the client 100 for achieving the live media streaming system introduced by the disclosure includes a timestamp regulator 250 and a frame demander 260.

The elements labeled with the same referral numbers as in FIG. 2A will not be repeatedly described herein. The downloader 240 is connected to the timestamp regulator 250 and configured to receive encoded data and transmit the same to the timestamp regulator 250. The buffer unit 220 is connected to the player 210, the timestamp regulator 250 and the frame demander 260. The timestamp regulator 250 transmits the encoded data to the buffer unit 220 for temporarily storing the same.

The downloader 240 is configured to download media data. The timestamp regulator 250 receives the media data from the downloader 240 and modifies playback time of some specific image data, such that a playback speed thereof is regulated according to the modified timestamp. The frame demander 260 transmits a frame request and provides required information to the media provider to request for an adjustment of transmission order of the media data.

With reference to FIG. 2C, a schematic block diagram of a system used in a client of the live media streaming system according to one of the embodiments is illustrated. Here, a client 100 includes a player 210, a buffer unit 220, a bandwidth estimator 230 and a downloader 240, and a system used in the client 100 for achieving the live media streaming system introduced by the disclosure also includes a timestamp regulator 250, a frame demander 260 and a stream demander 270.

The elements labeled with the same referral numbers as in FIG. 2A will not be repeatedly described herein. The downloader 240 is connected to the timestamp regulator 250 and configured to receive encoded data and transmit the same to the timestamp regulator 250. The buffer unit 220 is connected to the player 210, the timestamp regulator 250, the frame demander 260 and the stream demander 270. The timestamp regulator 250 transmits the encoded data to the buffer unit 220 for temporarily storing the same.

The timestamp regulator 250 receives the media data from the downloader 240 and modifies playback time of some specific image data, such that a playback speed thereof is regulated according to the modified timestamp. The frame demander 260 transmits a frame request and provides required information to the media provider to request for an adjustment of transmission order of the media data. The stream demander 270 transmits a bit rate request to the media provider and provides the required information to the media provider to request for providing new streaming media data of a different bit rate to the client 100.

Figure 3:
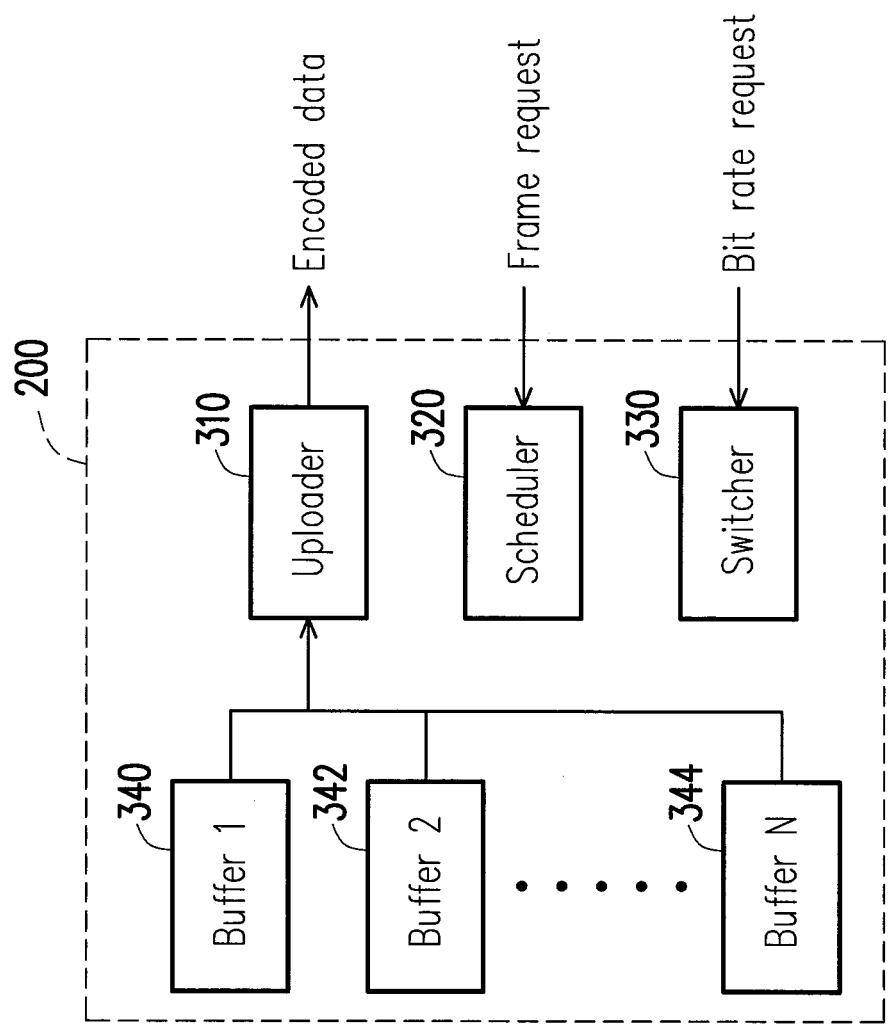
FIG. 3 is a schematic block diagram illustrating a system configured as a host of the live media streaming system according to one of the embodiments of the disclosure.

With reference to FIG. 3, FIG. 3 is a schematic block diagram illustrating a system configured as a server of the live media streaming system according to one of the embodiments of the disclosure. Here, a server 200 is illustrated as a streaming server, but the disclosure is not limited thereto. The server 200 includes an uploader 310 and at least one buffer. For descriptive convenience, only buffers 340~344 are illustrated, but the disclosure is not limited thereto. In order to achieve the function of the server 200 in the live media streaming system introduced in the disclosure, the server 200 may further optionally include a scheduler 320 and/or a switcher 330 according to different requirements for implementing the client. For example, in a scenario where the client is in the architecture depicted in FIG. 2A, the server 200 operated therewith may merely include the scheduler 320. In a scenario where the client is in the architecture depicted in FIG. 2C, the server 200 operated therewith may further include the scheduler 320 and the switcher 330.

The uploader 310 is configured to transmit data to a media receiver of the next stage, such as the client 100 depicted in FIG. 2. The scheduler 320 is configured to adjust a transmission order of the data to be transmitted to the media receiver. The switcher 330 is configured to determining the first media data to be transmitted. Each of the buffer 340~344 stores streaming data with its corresponding bit rate.

Figure 4A:
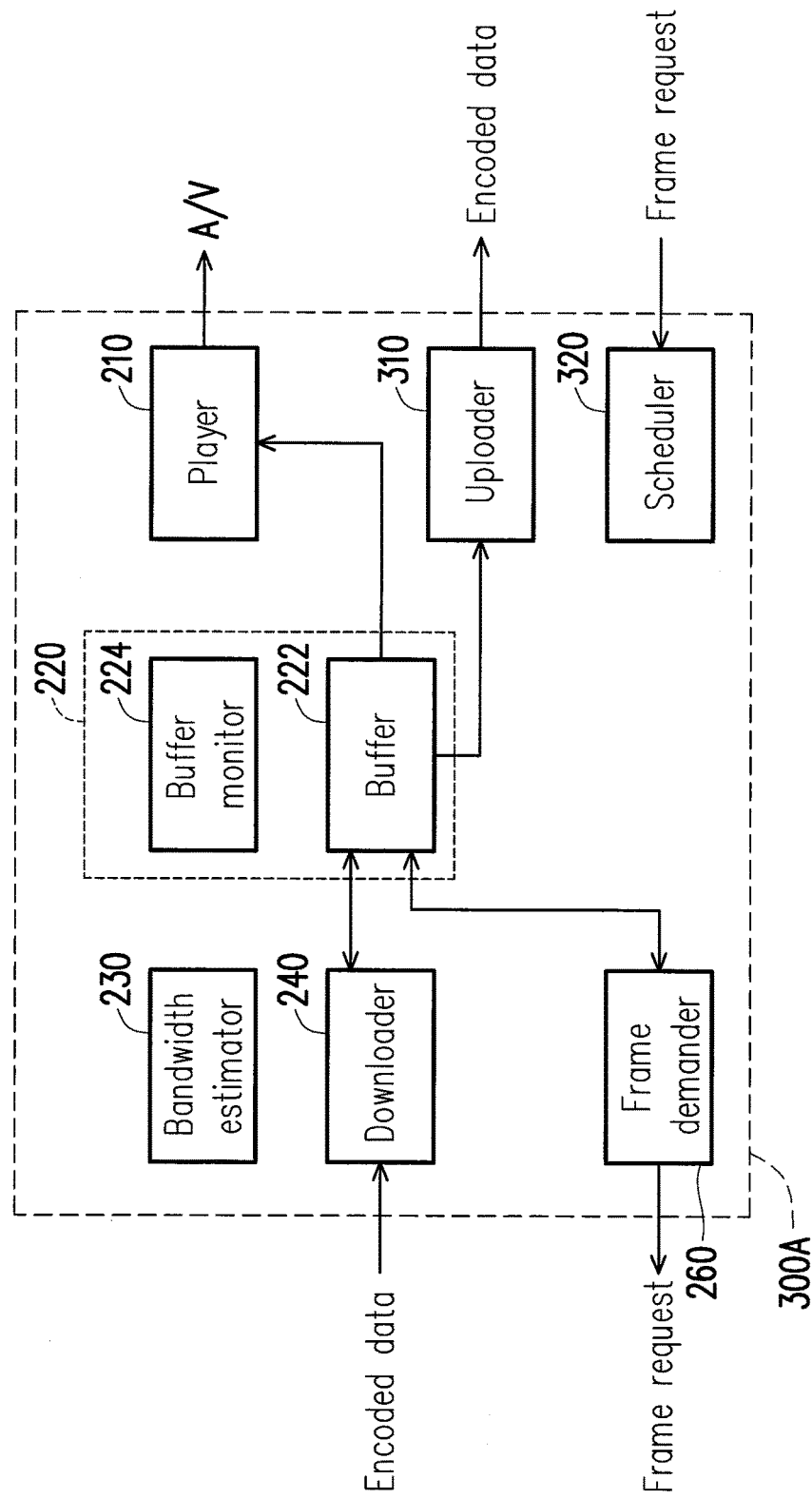
FIGS. 4A~4C are schematic block diagrams illustrating systems used in clients of the live media streaming system according to the embodiments of the disclosure.
Figure 4B:
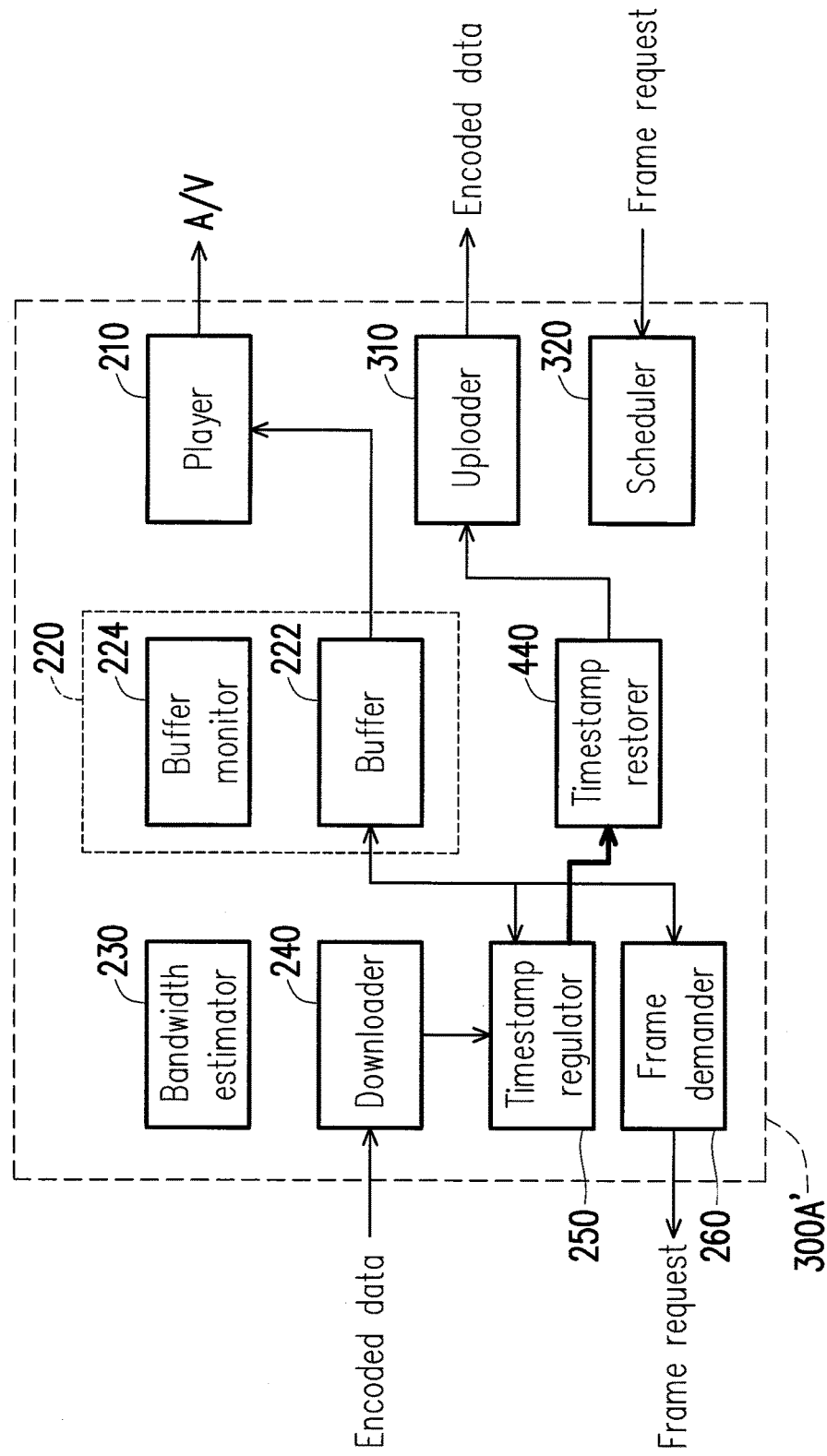
Figure 4C:
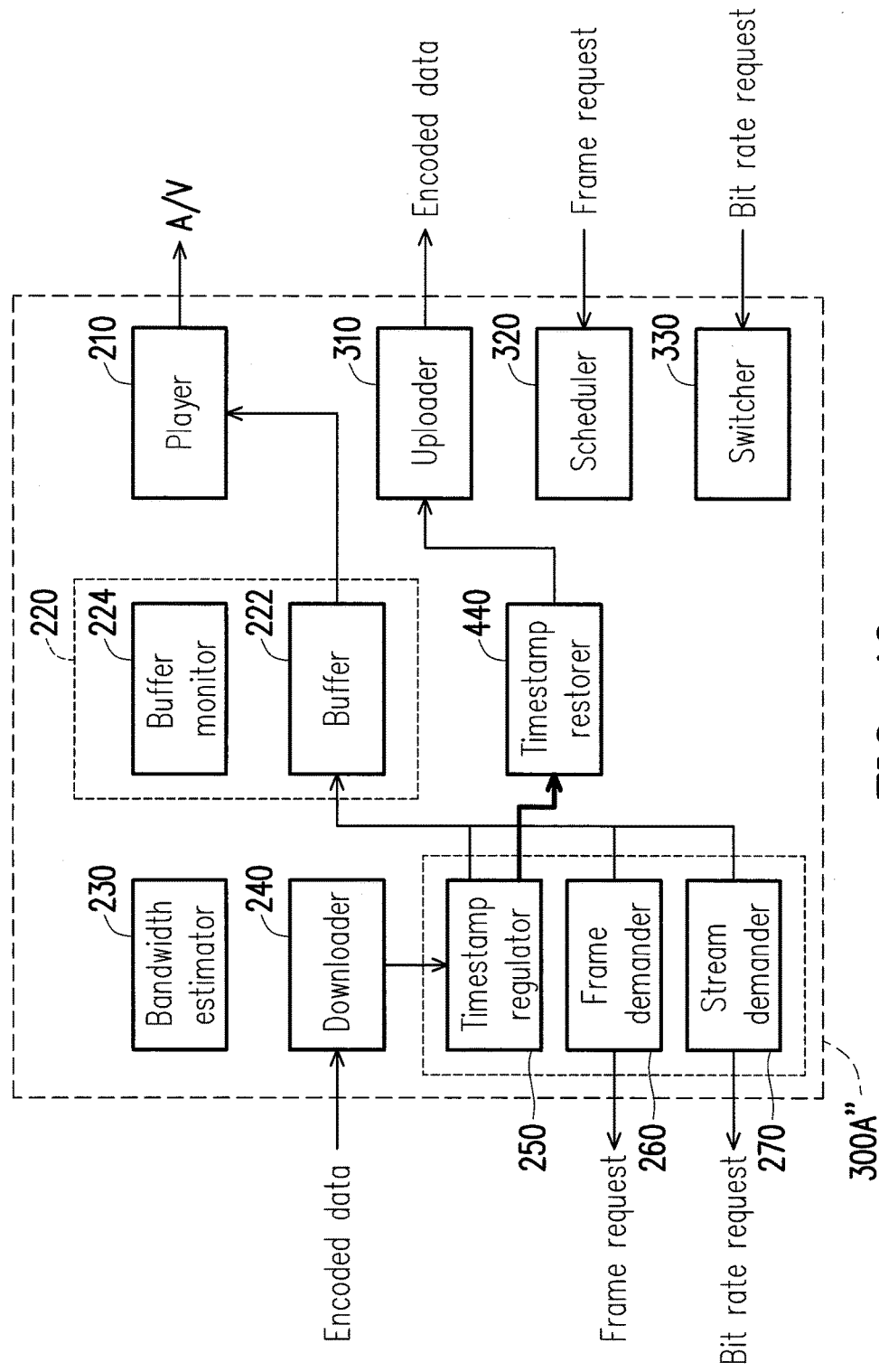

FIGS. 4A~4C are schematic block diagrams illustrating systems used in clients of the live media streaming system according to the embodiments of the disclosure.

Referring to FIG. 4A, it is a schematic block diagram illustrating a system used in a client of the live media streaming system according to one of the embodiments of the disclosure. In the present embodiment, the client 300A, which is one of the peers in the P2P architecture depicted in FIG. 1, is illustrated in the schematic block diagram. The client 300A includes the player 210, the buffer unit 220, the bandwidth estimator 230, the downloader 240 and the frame demander 260. In order to be configured as a media provider under the P2P architecture, the client 300A further includes the uploader 310 and the scheduler 320. In the present embodiment, the elements same as or similar to those in FIG. 2A and FIG. 3 are labeled with the same or similar referral numbers, and will not be repeatedly described hereinafter. The buffer 222 transmits the data to the uploader 310 and the uploader 310 transmits the data to the next peer under the P2P architecture.

Referring to FIG. 4B, it is a schematic block diagram illustrating a system used in a client of the live media streaming system according to one of the embodiments of the disclosure. In the present embodiment, a client 300A', which is one of the peers in the P2P architecture, is illustrated in the schematic block diagram. The client 300A' includes the player 210, the buffer unit 220, the bandwidth estimator 230, the downloader 240, the timestamp regulator 250 and the frame demander 260. In order to be configured as a media provider under the P2P architecture, the client 300A' further includes the uploader 310 and the scheduler 320. In the present embodiment, the elements same as or similar to those in FIG. 2B and FIG. 3 are labeled with the same or similar referral numbers, and will not be repeatedly described hereinafter. The client 300A' further includes a timestamp restorer 440. The timestamp restorer 440 is connected to the timestamp regulator 250 and configured to restore the playback time information modified by the timestamp regulator 250 or modify the same as an timestamp of a media stream acceptable for the media receiver of the next stage and then, transmits the same to the next peer in the P2P architecture through the uploader 310.

Referring to FIG. 4C, it is a schematic block diagram illustrating a system used in a client of the live media streaming system according to one of the embodiments of the disclosure. In the present embodiment, a client 300A", which is one of the peers in the P2P architecture, is illustrated in the schematic block diagram. The client 300A" includes the player 210, the buffer unit 220, the bandwidth estimator 230, the downloader 240, the timestamp regulator 250, the frame demander 260 and the stream demander 270. In order to be configured as a media provider under the P2P architecture, the client 300A" further includes the uploader 310, the scheduler 320 and the switcher 330. In the present embodiment, the elements same as or similar to those in FIG. 2C and FIG. 3 are labeled with the same or similar referral numbers, and will not be repeatedly described hereinafter. The client 300A" further includes the timestamp restorer 440. The timestamp restorer 440 is connected to the timestamp regulator 250 and configured to restore the playback time information modified by the timestamp regulator 250 or modify the playback time information modified by the timestamp regulator 250 as an timestamp of a media stream acceptable for the media receiver of the next stage and then, transmits the same to the next peer in the P2P architecture through the uploader 310.

It should be noticed that in the drawings or the foregoing embodiments in the disclosure, the functional units are labeled as functional blocks or modules in order to specifically emphasize the independence of implementing the same. For example, the functional blocks or modules may be implemented as hardware circuits including a VLSI circuit or a gate array, such as a readily available semiconductor, composed of logic chips, a transistor or any other discrete element. Or, the modules may be implemented in a programmable hardware apparatus in a form, such as a programmable gate array, programmable array logics, a programmable logical apparatus or the like. Otherwise, the modules may be implemented in software executed by various types of processors. For example, a module for recognizing an executable code includes one or more physical or logical blocks of a computer command, and the blocks may be organized as an object, a procedure or a function. However, executable program of the recognition module are not necessarily located with each other, and may include different commands stored in different locations. When the commands are logically combined altogether, the module is included therein to achieve a purpose specified by the module.

The executable code module may be a single command or multiple commands, which may be distributed in different program segments, different programs and a plurality of memory devices. Likewise, operation data here may be recognized and described in the module and may be implemented and organized in any appropriate format of any type of data structure. The operation data may be collected in a single dataset or distributed in different locations (distributed in different storage apparatuses) and may be configured as electrical signals which at least partially exist.

Specific Method Steps

The method introduced by the disclosure will be described according the following embodiments, but the disclosure is not limited thereto. The system and the method introduced by the disclosure may be applicable to all occasions that are similar to the following embodiments. A I-frame, a P-frame, a B-frame or I, P, B-slices used by currently available image compression algorithms such as MPEG series, H.263, H.264 and so forth, may used in the description of the disclosure.

Method of Downloading According to Importance Order

Figure 5:
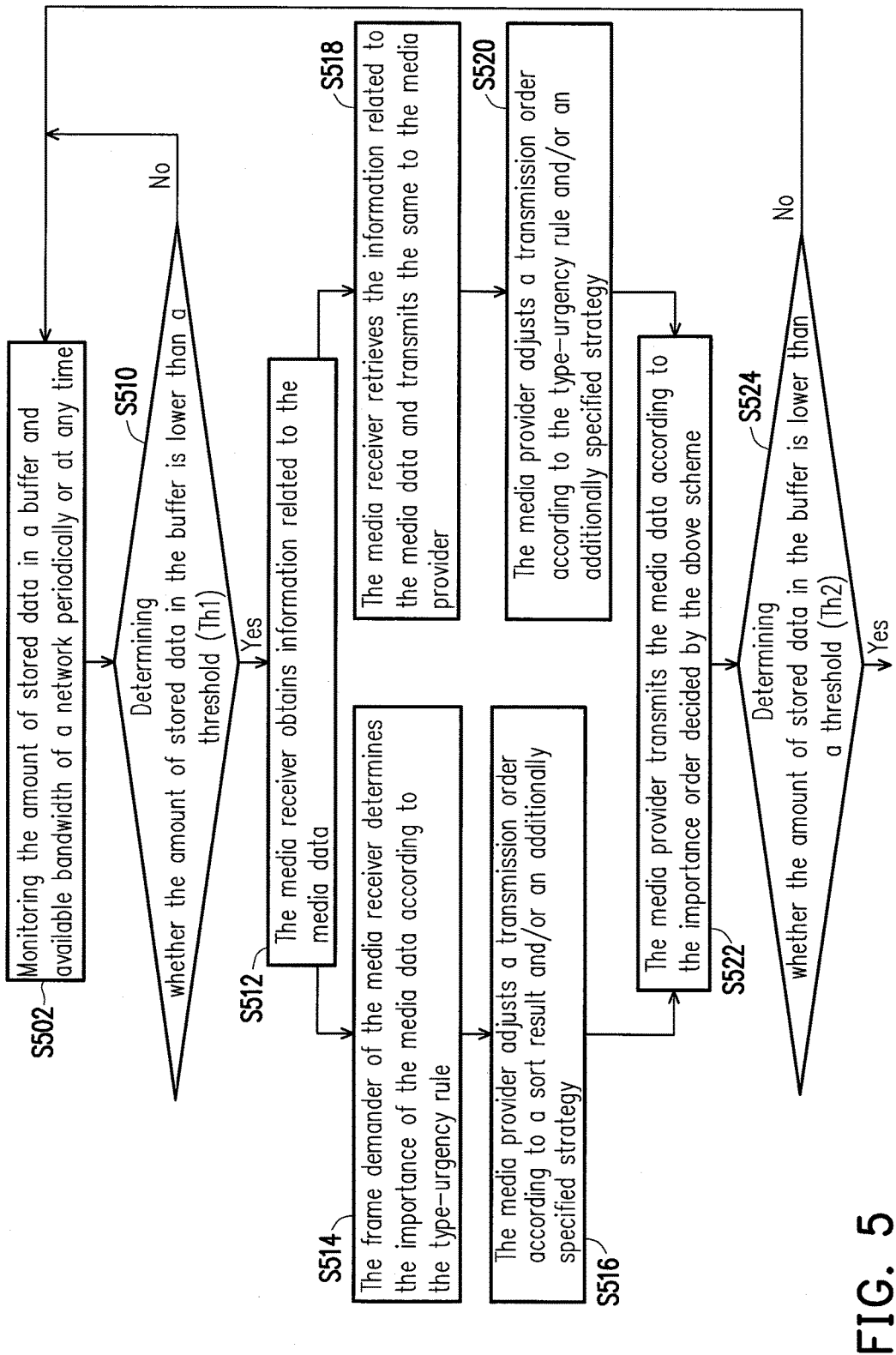
FIG. 5 is a flowchart illustrating a method of operating a download order based on importance according to one of the embodiments of the disclosure.

According to one of the embodiments of the disclosure, a method of operating a downloading order based on importance is introduced, which will be described with reference to FIG. 5.

First, in step S502, a buffer monitor of a media receiver monitors the amount of stored data of a buffer periodically or at any time, and a bandwidth estimator of the media receiver monitors an available bandwidth of a network.

In step S510, the buffer monitor determines whether the amount of stored data of the buffer is lower than a threshold (which is represented as Th1 herein). If not, the monitor operations are continued. If yes, a frame demander of the media receiver executes the following steps to process a certain portion of media data which are going to be downloaded. In S512, the media receiver obtains information related to the media data, such as group of picture (GOP) information, the number of media provider, whether to adopt a network coding technique, playback time of encoded data to be downloaded, a predicted size of data, a predicted decoding time, an available bandwidth and so forth.

The GOP information is, for example, a frame arrangement of two successive I-frames in the MPEG video. A GOP is referred to as a group of pictures or composed of successive images in a media stream, which are encoded by the MPEG. Each film or media steam encoded by the MPEG is composed of successive GOPs.

After the aforementioned information is obtained, the media receiver may decide a method of processing. In an embodiment, the media data is sorted according to an importance order, and then, the sort result is transmitted to one or more media providers. For instance, referring to steps S514~S516, in step S514, the frame demander of the media receiver determines the importance of the media data according to a type-urgency rule so as to sort a portion of the media data to be received later according to the importance. Then, in step S516, when a request received by the media provider from the media receiver is a "sort result", the media provider updates a transmission order of the media data to be transmitted subsequently according to the sort result. Additionally, in another embodiment, the scheduler of the media provider may further change the importance of the image to adjust the transmission order according to an additionally specified strategy, such as showing a trademark in an image as required by an advertising company, or determining by a scene analysis program that humans are suspected to appear in a disaster screen.

In still another embodiment, the media receiver simply transmits the information related to the obtained media data, such as reference information for sort (e.g. the available bandwidth of a network, a current playback progress, a current status of the buffer and so forth), to the media provider and requests the media provider to decide a transmission order of a portion of data which are going to be transmitted, as in steps S518~S520.

In step S518, the frame demander of the media receiver transmits the reference information for sort (e.g. the available bandwidth, the current playback progress, the current status of buffer or a processed result of the aforementioned information), which can be retrieved from the obtained media data, to the media provider. In step S520, the scheduler of the media provider decides an order of a portion of the media data to be transmitted later according to the reference information for sort with the type-urgency rule and/or an additionally specified strategy, and namely, the portion of media data is sorted according to its importance.

In step S522, the media provider transmits the media data according to the importance order decided by the above scheme. The media receiver or the media provider may finely adjust the current sorting order according to information related to the latest available bandwidth in the following conditions: a certain amount of data have been sent, a schedule of transmission has been completed, a fixed or unfixed time period has passed. In the meantime, the media receiver or the media provider examines whether the transmission of the current schedule influences the transmission of the next portion of encoded data to be sorted. If not, the transmission of the current schedule continues to be transmitted. If yes, the transmission of the current schedule will be stopped, and return to step S502, and the next portion of media data will be sorted and assigned with new transmission order.

In step S524, if the buffer monitor discovers that the amount of stored data of the buffer exceeds another threshold (which is represented by Th2 hereinafter), wherein Th1 is smaller than Th2 (to avoid frequently switching between the importance order and the encoding order), the media receiver informs the media provider to return to the original transmission mode (i.e. to transmit media data according to the original encoding order) when the next unscheduled media data starts to be transmitted.

The aforementioned method of downloading according to the importance order is applicable to various scenarios as follows, but the disclosure is not limited thereto.

Scenario 1: there is a single media provider, and a structure of each GOP is known (for example, some encoders adopt a fixed GOP structure).

Scenario 2: there is a single media provider, the structure of each GOP is unknown (for example, some encoders increase/decrease an appearance frequency of I-frames according to a change of the scenario).

Scenario 3: there is a plurality of media providers, the structure of each GOP is known, and the media data is not encoded by utilizing an encoding technique, such as network coding.

Scenario 4: there is a plurality of media providers, the structure of each GOP is known, and the media data is encoded by utilizing an encoding technique, such as the network coding.

Scenario 5: there is a plurality of media providers, the structure of each GOP is unknown, and the media data is not encoded by utilizing an encoding technique, such as the network coding.

Scenario 6: there is a plurality of media providers, the structure of each GOP is unknown, and the media data is encoded by utilizing an encoding technique, such as the network coding.

In the scenarios 1 or 4, a portion of the media data to be sorted may be sorted by either the media receiver or the media provider.

In the scenarios 2 or 6, it is more appropriate that the portion of media data to be sorted is sorted by the media provider since the provider may know earlier than the receiver about the GOP structure of the media data to be sorted.

In the scenarios 3 or 5, it is more appropriate that the portion of media data to be sorted is sorted by the media receiver, since it is not easy for different media providers to cooperate with each other under the scenarios. The media receiver sorts the media data according to a union of information of the GOP structure obtained from the media providers.

In all above scenarios, it is impractical to calculate the importance of a tremendous amount of data. Thus, only a suitable amount of data is calculated per a period of time. In the embodiments of the disclosure, the aforementioned step of calculating the importance of a portion of data per a period of time is performed on all images in the GOP and the audio data during the playback time of the images. For descriptive convenience, the video and audio data whose importance is evaluated is referred to as an evaluation object collection. However, if there are not many images in the GOP, the method introduced by the disclosure may be applicable to considering a plurality of GOPs as an evaluation object collection for saving cost. If a length of a playback time of a GOP is very long, the method introduced by the disclosure divides the GOP into a plurality of evaluation object collections for improving efficiency.

When the method of downing according to the importance order is started, images that are not downloaded yet among the images of the GOP being currently downloaded and the audio data within the playback time of the images are considered as a first evaluation object collection. Every time before the evaluation operation is performed, a latest start time of downloading the most important information (which may be I-frames or audio data of the GOP) of the next evaluation object collection is calculated first, so as to know the time length available for the current evaluation object collection to download.

In the foregoing embodiments, the method of downloading according to the importance order is referred to as performing an adjustment of transmission order according to an indicator parameter, in which, for example, the adjustment is performed according to the importance obtained by calculating the data, but the disclosure is not limited thereto. Any combination of factors for adjusting the download order may be referred to as an importance parameter. The combination may be varied with designing requirements and may include, for example, the GOP information of the received media content, the playback time of the evaluated encoded data, the predicted size of data, the predicted decoding time, the available bandwidth, the number of the media provider, whether the encoded data adopts the network coding technique. In another embodiment, an additionally specified strategy may also be used, such as showing a trademark in an image as required by an advertising company, or determining by a scene analysis program that humans are suspected to appear in a disaster screen, to change the importance of the image to adjust the transmission order according to the additionally specified strategy.

Figure 6:
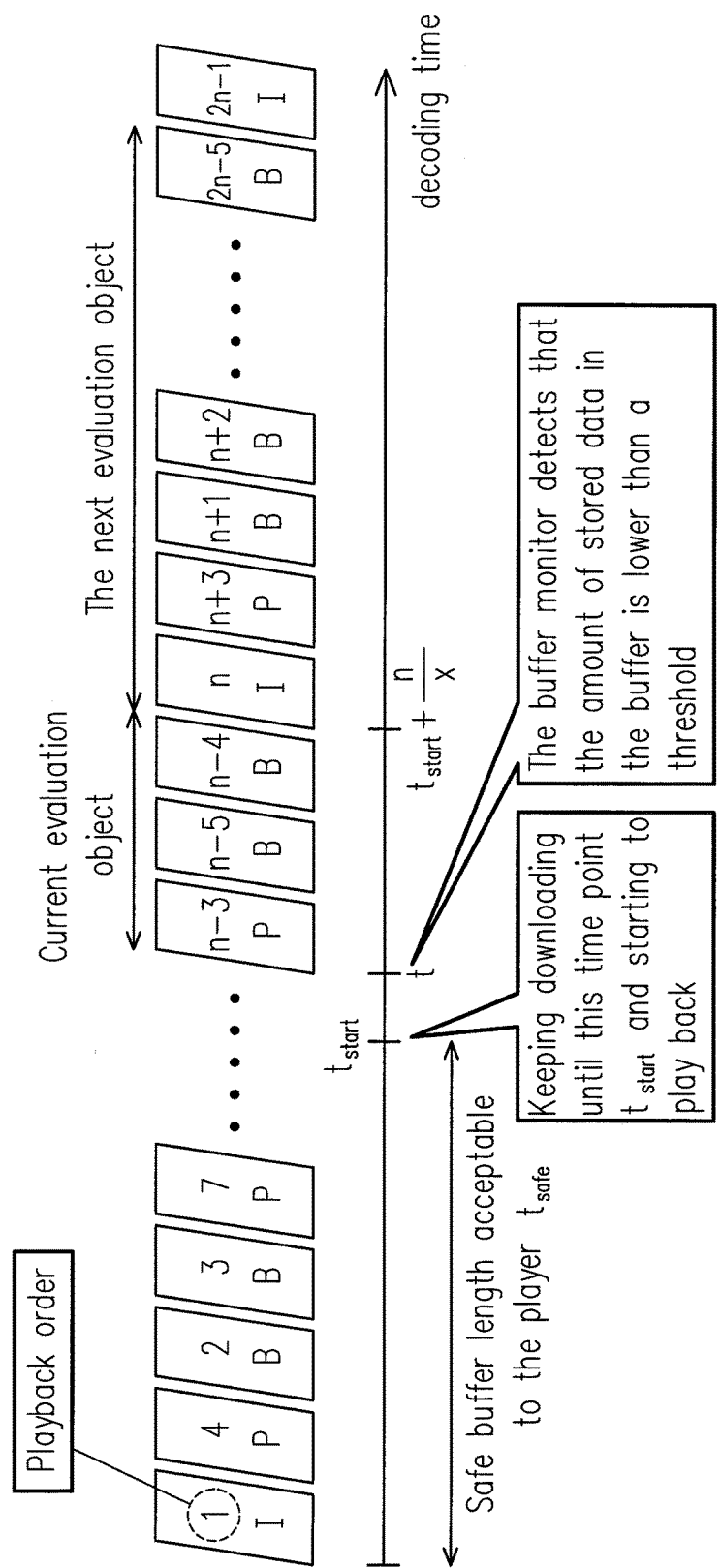
FIG. 6 is a schematic diagram illustrating the method of deciding a latest start time of downloading a frame according to the embodiments of the disclosure.

Referring to FIG. 6, a schematic diagram illustrating the method of deciding a latest start time of downloading each I-frame according to the embodiments of the disclosure. Other data, such as P frame, B frame, or audio, determination principle is the same as the present embodiment and namely, is applicable to the method introduced by the disclosure, and will not be repeatedly described hereinafter.

First, given that the media receiver has enough data, a $Y^{th}$ frame to be played has an identifier of Y, and a first frame to be played has an identifier of 1 (where an identifier is a number shown at the top in each frame depicted in FIG. 6, and the frame is presented in rhombus). If an I-frame has an identifier of n, and a frame rate of the stream is fixed to x frames per second (fps), that is, a time period of presenting each frame is 1/x seconds. In addition, the player of the media receiver starts to play at a time $t_{start}$, the I-frame having the identifier of n is to be played at the time $t_{start}+(n/x)$ seconds. Regarding the time $t_{start}$, it is the time point when the buffer monitor observes that a data amount within a safe buffer time length $t_{safe}$ accepted by the player is transmitted to the player.

Given that an available bandwidth within an appropriate time period later is represented as w, a predicted size of the I-frame having the identifier of n is represented as s, and a predicted decoding time of the I-frame is represented as $t_{decode}$, it can be derived that the latest download start time of transmitting the I-frame having the identifier of n from the media provider is $t_{urgent}=(t_{start}\ n/x)-t_{decode}-(s/w)$. Such method may also applicable to evaluating latest download start times of a P-frame, a B-frame and an audio.

Here, it is assumed that a time point t is obtained by the current time plus the time spent for the media receiver to send a request to the media provider, and a latest download start time of an I-frame of the next evaluation object collection is t', an available time period for the current evaluation objection collection is t'−t.

Before sorting, it is to be noticed that when the importance of data is assigned by the media receiver, an importance of an audio is decided according to a film type (for example, the audio is important for a speech program while the audio is not important for a material arts program), manually designated by a user, or periodically informed by the media provider in advance about the importance degree of the audio of the next evaluation object.

If the audio is considered as having the highest importance, all audios in the evaluation object collection are downloaded first and then frames. Given that the time period for downloading all the audios is $T_{sound}$, only a time period of $t'-t-T_{sound}$ is assigned for evaluating the importance of the frames. If the audios have the lowest importance, the audios won't be downloaded until all frames are downloaded. If the importance of the audios is between I-frames and P-frames, the I-frames are downloaded first, then the audios, and the remaining time is for the P-frames and B-frames. If the importance of the audios is between the P-frames and the B-frames, the I-frames and the P-frames are downloaded first, then the audios, and the remaining time is for the B-frames. If the audios have the same importance as the P-frames, when each P-frame is downloaded, then the audio with the playback time between the downloaded P-frame and its previous reference frame is downloaded (or, it may be the audio downloaded first and then the P-frame, in other embodiment).

In the embodiment of the disclosure, the importance is represented by a number, where the greater number represents the greater importance. For example, it is assumed here that the greatest importance is M+1 while the smallest is 0. The value M should be at least the number of the evaluation object collections and is suggested to be a positive integer. Alternatively, a real number or any other value used for representing a degree of difference may be applied to the present embodiment.

Taking the aforementioned scenario 1 for example, there is only one media provider, and the structure of each GOP is known. The media receiver assigns the importance to the media data according to the data type (i.e. the audio data, the I, the P and the B frames) and the urgency of playback time, which is referred to as a type-urgency assignment. The concept of assigning the importance according to the data type lies in that if a decoding failure of a frame would result in the decoding failures of more frames, it represents the frames has the higher importance. The concept of assigning the importance according to the urgency lies in that if the data having the greater urgency to be played, it represents the playback deadline of the data is easier to be missed and thus, has the higher importance.

Assigning the Importance According to the Data Type

The importance related to the I-frame may be assigned as M.

The importance related to an audio may be assigned according to the following rules, including (1) if the audio is more important than the I-frame, the importance of the audio is assigned as M+1, (2) if the audio is the least important, the importance of the audio is assigned as 0, (3) if the importance of the audio is between the I-frame and the P-frame, the importance of the audio is assigned as M−1, (4) if the importance of the audio is between the P-frame and the B-frame, the importance of the audio is assigned as the importance of the last P-frame minus 1, and thereafter, if the importance of the P-frame is changed as d, the importance of the audio is also changed as d−1, and (5) if the importance of the audio is identical to the P-frame (or the B-frame), the importance of each P-frame (or each B-frame) is set identical to the importance of the corresponding audio, wherein the corresponding audio refers to the audio between the playback time point of the P-frame (or the B-frame) and the playback time point of its previous frame or its next frame, and thereafter, if the importance of the P-frame (or the B-frame) is changed as d, the importance of the corresponding audio is also changed as d.

Regarding the importance of the P-frames, unassigned values among M~0 (from the greatest to the smallest) are assigned to the P-frames (from the oldest to the latest according to the playback time). For example, the evaluation object collection contains three P-frames, P1, P2 and P3, where P1 is played prior to P2, and P2 is played prior to P. The current importance M is assigned to the I-frame, and the importance M−1 is assigned to the audio, and therefore, an importance M−2 may be assigned to P1, M−3 may be assigned to P2, and M−4 may be assigned to P3.

The importance related to a B-frame may be assigned according to the following steps. (1) B-frames having successive playback time are considered as a B-frame group, where an unselected B-frame having the greatest data amount is selected from each B-frame group arranged from the B-frame group having the earliest playback time to the B-frame group having the latest playback time. For example, if the evaluation objects include I1, B3, B4, P2, B5 and B6, B3 and B4 are a B-frame group, and B5 and B6 are a B-frame group. Given that the condition regarding data amount, B3>B4 and B6>B5 are provided, B3 and B6 are selected first. (2) The unassigned values among M−0 are assigned to the selected B-frames, from the greatest to the smallest (i.e. from the B-frame having the greatest data amount to the B-frame having the smallest data amount, and further from the B-frame having the earliest play back time to the B-frame having the latest play back time if there is a plurality of B-frames having the same data amount). If it is assumed that M~M−2 are already assigned, in the above example where B3 has the greater data amount than B6, B3 is assigned with an importance value of M−3, and B6 is assigned with an importance value of M−4. (3) If there are still B-frames to be assigned with importance values, step (1) is returned to until all of the B-frames are assigned with importance values.

So far, the importance is assigned only according to the data type. In the method as introduced above, both the dependency of data encoding and uniformity of the distribution of the B-frames (the evenly distributed frames are played more fluently than the unevenly distributed frames) have been considered, and the B-frames with the greater data amount have the priority over the B-frames with the smaller data amount.

Assigning the Importance According to the Urgency of Playback Time

In another embodiment, the importance of media data is adjusted according to the urgency of playback time by adopting a manner similar to the bubble sorting method which has a very small calculation amount.

If a sum of time of downloading all data which is more important than all unadjusted B-frames exceeds the available downloading time (i.e. the aforementioned time period t'−t) of the evaluation object collection, the importance of the unadjusted B-frames and/or audio data do not have to be adjusted again according to the urgency of playback time.

If the sum of time of downloading all the data which is more important than all unadjusted B-frames does not exceed the available downloading time (i.e. the aforementioned time period t'−t) of the evaluation object collection, the B-frame having the highest importance among the unadjusted B-frames tries to exchange importance with data conforming to all of the following requirements. (1) The data to be exchanged with has an importance value higher than the B-frame for 1. (2) The data to be exchanged with is not the data which has to be directly or indirectly referred to when decoding the B-frame. (3) The possibility for the data to be exchanged with to start downloading before its latest start time for downloading is not changed due to importance exchanging (4) The possibility for the download finalizing time of the data to be exchanged with to exceed the latest start time for downloading the most important data in the next evaluation object is not changed due to importance exchanging.

When there is no data to be exchanged with conforming to the aforementioned requirements and if the downloading time of the B-frame being adjusted neither exceeds its latest start time for downloading nor exceeds the latest start time for downloading the most important data in the next evaluation object, the adjustment of the B-frame is finalized. Otherwise, all adjustments made to the B-frame being adjusted is restored, and the adjustment of the B-frame is considered as finalized.

Figures 7A, 7B:
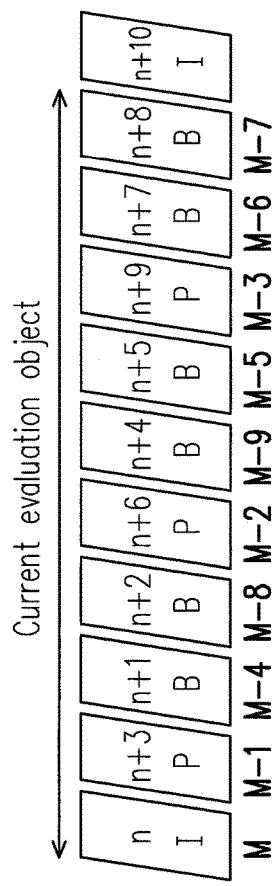
FIGS. 7A~7C are schematic diagrams of assigning the importance based on the data type according to the embodiments of the disclosure.
Figure 7C:
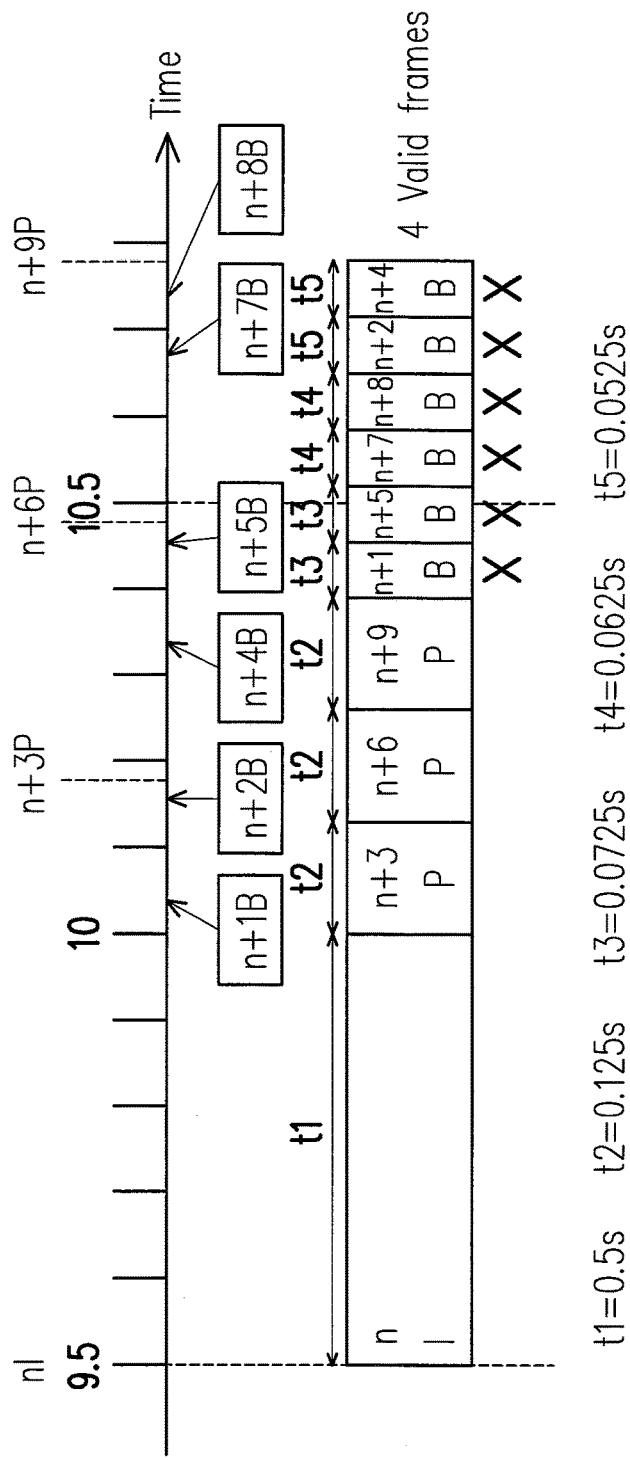

In the following examples, schematic diagrams of how to assign the importance according to the data type by using the type-urgency rule will be described with reference to FIGS. 7A~7C. In order to simplify the description, the audio data is not included in this example. FIG. 7A illustrates an evaluation object collection including nI, n+3P, n+1B, n+2B, n+6P, n+4B, n+5B, n+9P, n+7B and n+8B. Herein, I, P and B are referred to I-frames, P-frames and B-frames, and the numbers ahead are represented playing orders. According to the method of assigning the importance according to the data type as set forth above, the aforementioned data are assigned with importance M, M−1, M−4, M−8, M−2, M−9, M−5, M−3, M−6 and M−7, respectively. However, the importance orders are temporarily assigned in this stage. FIG. 7B illustrates the latest start download time and reference information of the frames. In this case, a stream has 10 frames per second, the bit rate is 2000 Kbps, and the recently available bandwidth in the immediate future is estimated as 1600 Kbps. FIG. 7C illustrates the current transmission strategy of the embodiments of the disclosure, wherein the latest start download time of the frame is marked on the time axis, a dashed line represents a latest start download time of the most important data in the next evaluation object, i.e. the time of 10.5. Predicted transmission time of evaluation objects nI, n+3P, n+6P, n+9P, n+1B, n+5B, n+7B, n+8B, n+2B and n+4B are t1, t2, t2, t2, t3, t3, t4, t4, t5 and t5 respectively, wherein each of the predicted transmission time corresponds to the data amount of each of the frames to be transmitted divided by the available bandwidth in the immediate future.

Referring to FIG. 7C, the transmission effect by the method introduced by one of the embodiments of the disclosure is shown. So far, it ensures that the 4 frames nI, n+3P, n+6P and n+9P may reach the media receiver on time.

Figure 8A:
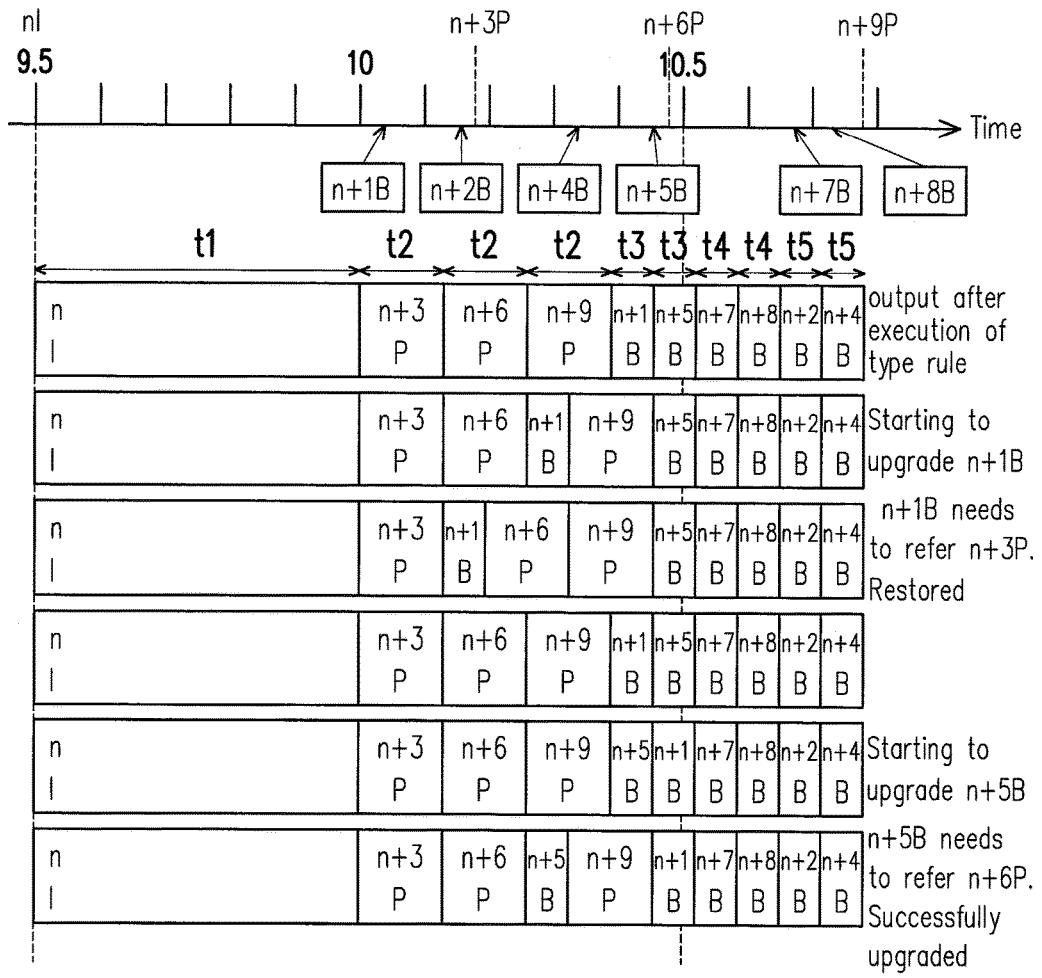
FIGS. 8A~8C are schematic diagrams illustrating processes of adjusting the importance of media data based on the playback deadline according to the embodiments of the disclosure.
Figure 8B:
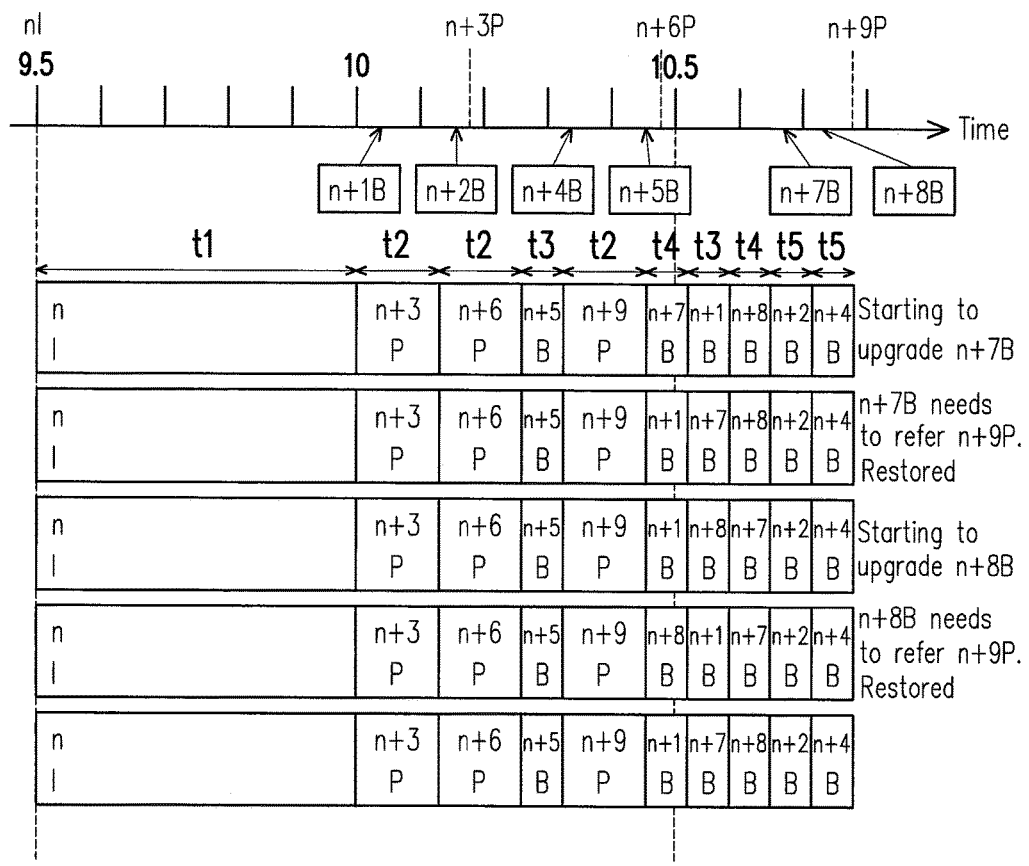
Figure 8C:
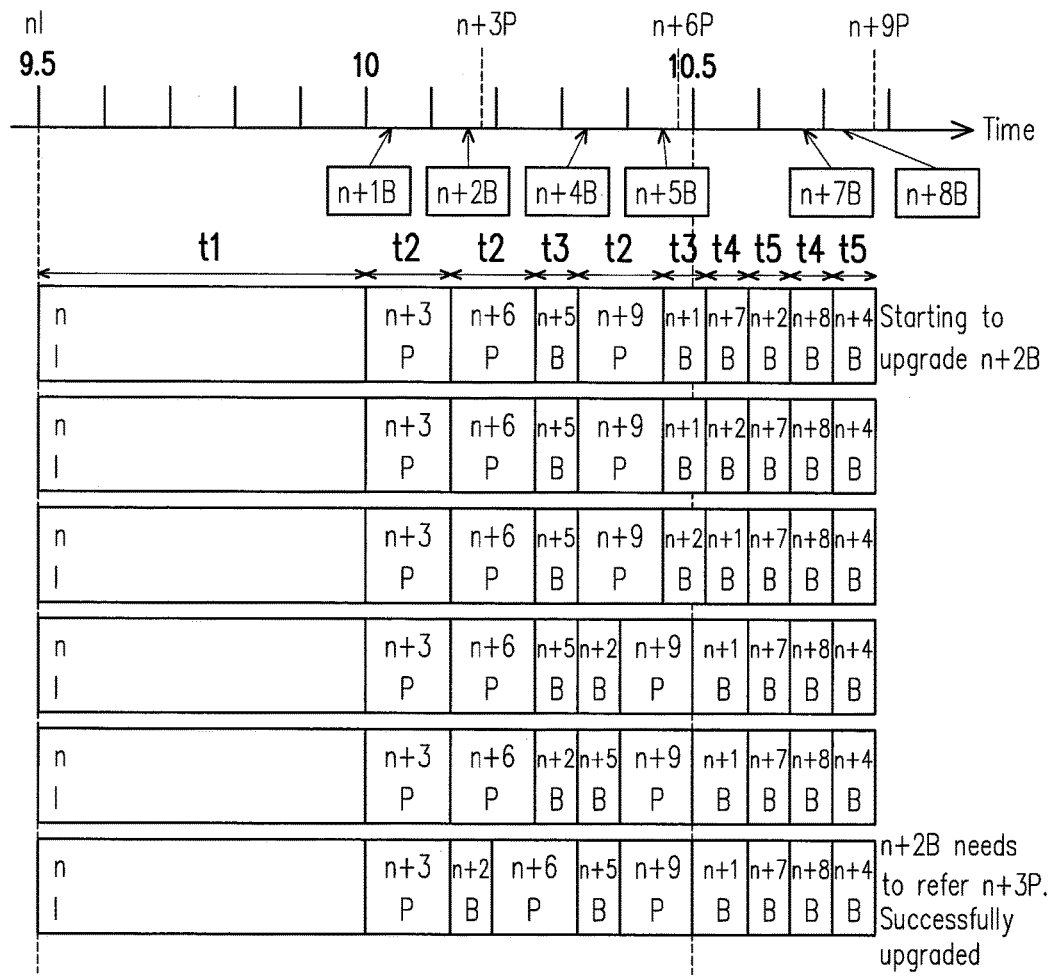

FIGS. 8A-8C are schematic diagrams illustrating processes of adjusting the importance of media data according to the urgency of playback time according to the embodiments of the disclosure, where examples thereof will be described.

FIG. 8A illustrates a process of increasing the importance of n+1B and n+5B, where the importance of n+1B is exchanged with n+9P first, and then, the importance of n+1B is exchanged with n+6P. Afterward, since n+3P is required for decoding n+1 B, their importance is not allowed to be exchanged with each other. Further, n+1 B is not allowed to start to be downloaded before its latest start download time due to its importance, all adjustments made to n+1B are restored (i.e. the importance of n+1B is exchanged back with n+6P, and then the importance of n+1B is exchanged back with n+9P).

Then, the importance of n+5B is exchanged with n+1B first, and then, n+5B is exchanged with n+9P. Afterward, since n+6P is required for decoding n+5B, their importance is not allowed to be exchanged with each other. Further, n+5B is allowed to start to be downloaded before its latest start download time based on its importance and does not influence the possibility that the finalization time of downloading the exchanged n+9P exceeds the latest start download time of n+10I, thus, the adjustment of n+5B is completed.

FIG. 8B illustrates a process of increasing the importance of n+7B and n+8B, where the importance of n+7B is exchanged with n+1B. Afterward, since n+9P is required for decoding n+7B, their importance is not allowed to be exchanged with each other. In addition, the importance of n+7B would delay the downloading of n+10I, the adjustment of the n+7B is restored (i.e. the importance of n+7B is exchanged back with n+1B).

Then, the importance of n+8B is exchanged with n+7B, and n+8B is exchanged with n+1B. Since n+9P is required for decoding n+8B their importance is not allowed to be exchanged with each other. In addition, the importance of n+8B would delay the downloading of n+10I, and thus, all the adjustments of n+8B are restored (i.e. n+8B is exchanged back with n+1B, and then n+8B is exchanged back with n+7B).

FIG. 8C illustrates a process of increasing the importance of n+2B, where the importance of n+2B is exchanged with n+8B first, n+2B is exchanged with n+7B, n+2B is exchanged with n+1B, n+2B is exchanged with n+9P, n+2B is exchanged with n+5B and then, n+2B is exchanged with n+6P. Afterward, since n+3P is required for decoding n+2B, their importance is not allowed to be exchanged with each other. Further, n+2B is allowed to start to be downloaded before its latest start download time based on its importance and does not influence the possibility that the finalization time of downloading the exchanged frames exceeds the latest start download time of n+10I, thus, the adjustment of n+2B is completed. At this time, the available time for transmitting the evaluation object collection is used up, n+4B may not have to try to upgrade its importance.

In the aforementioned embodiments, it may be ensured that 6 correctly decoded frames reach the media receiver on time.

In the scenario 1, if the media provider does not receive the importance assigned by the type-urgency rule form the media receiver, i.e. the sort result transmitted from the media receiver after its calculation, but the reference information required for the type-urgency instead, such as the reference information (e.g. the available bandwidth of a network, a current playback progress, a current status of the buffer and so forth) related to sorting, the media provider performs the type-urgency rule on behalf of the media receiver. The benefit to do so is that if having an equipment with poor capability, the media receiver may be replaced with the media provider having an equipment with better capability. No matter which performs the type-urgency rule, the output therefrom is further adjusted by the media provider once.

According to some additionally specified strategies, some frames or some portions of audio are marked as particularly important. These strategies may be required by advertising companies or decided after the media data is analyzed by some programs. When discovering the data marked according to the additionally specified strategy can be transmitted to the media receiver before the latest decoding time, and then, start to transmit the data after the sorting operation is completed. Otherwise, the scheduler of the media provider would try to upgrade the importance of the marked data.

Among the additionally specified strategies introduced by the disclosure, in one of the embodiments, an additionally marking method may be adopted, which will be described as follows.

Figure 9:
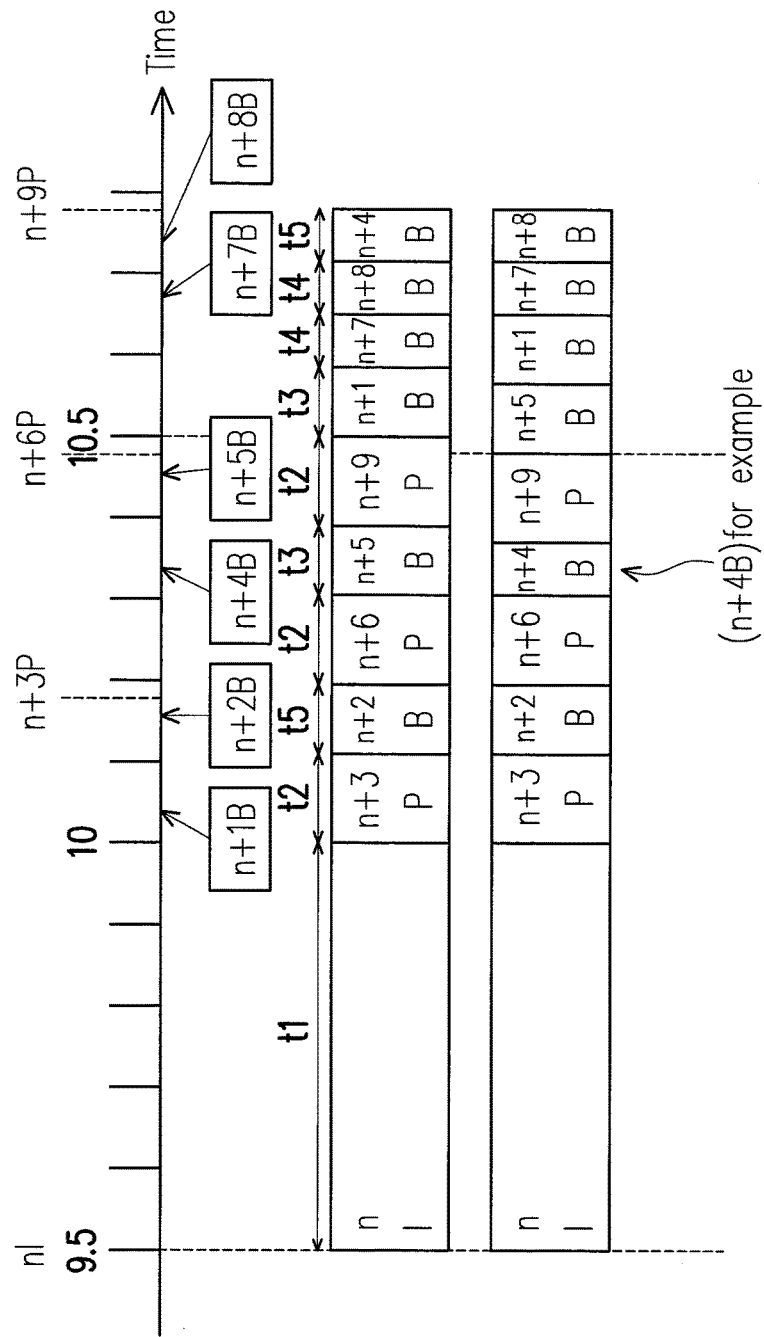
FIG. 9 is a schematic diagram illustrating a process of adjusting the importance of media data through an additionally marking scheme based on an additionally specified importance strategy according to the embodiments of the disclosure.

First, if a sum of time of downloading data which is more important than the unadjusted marked data (excluding the B-frames) already exceeds the available downloading time (i.e. the aforementioned time period t'-t) of the current evaluation object collection, the importance of the media data does not have to be adjusted. Otherwise, the importance of the one having the highest importance among the marked data which is not yet completely adjusted is upgraded to a level that is only smaller than the one having the smallest importance among the reference frames. During the process of increasing the importance, if the I-frames and the P-frames which are originally feasible to be downloaded on time becomes infeasible to be downloaded on time, the B-frames having the later playback time than the adjusted media data are tried to be removed from the schedule, i.e. the B-frames are removed from the one having the latest playback time. Whether the released time in the schedule is available for the data being adjusted is determined. If yes, the data is marked as completely adjusted. If not, the upgrade of the importance of the additionally marked data is given up. FIG. 9 is a schematic diagram illustrating a process of adjusting the importance of media data according to an additionally specified importance strategy and by adopting an additionally marking rule according to the embodiments of the disclosure. Referring to FIG. 9, taking n+4B for example, the importance of n+4B is upgraded to a level between n+6P and n+9P due to the additional specified importance strategy.

In the aforementioned scenario 2 (i.e. where there is a single media provider, and the structure of each GOP is unknown), the media receiver may not ensure the size of the current evaluation object collection but merely may provide the reference information to the media provider to request for assigning the importance on behalf of the media receiver. The information to be provided at least includes $t_{start}$ (the time of the player media receiver starts to play back), an identification code of a first frame which is played back by the media receiver, the bandwidth w which is available within an appropriate time period in the future, a predicted time $t_{decode}$ for decoding.

In the scenario 2, if the I-frame of the next evaluation object collection already appears in the buffer of the media provider, the importance of current evaluation object is assigned and the transmission order thereof is sorted directly according to the type-urgency rule as used in the scenario 1 and the additionally marking rule. If the I-frame of the next evaluation object collection does not appear, the data in the buffer which is not yet transmitted to the media receiver is considered as the current evaluation object collection, and the latest completing transmission time of the newest P-frame of the current evaluation object collection minus the current time t is configured as the available transmission time of the current evaluation object collection, and the assignment of the importance and the sorting of the transmission order are performed on the current evaluation object by using the type-urgency rule and the additionally marking method in the scenario 1.

In the scenario 3, where there are a plurality of media providers, and the structure of each GOP is known, and the media data are not encoded by utilizing an encoding technique, such as network coding, the media providers do not know about the operations of one another, and thus, to coordinate the order of transmitting the media data among one another is highly complicated. Accordingly, in the scenario, only the media receiver is allowed to decide the transmission order of the data according to the disclosure, and the decision method is similar to the type-urgency rule of the scenario 1. The only difference is that the available bandwidth w within an appropriate time period in the future, which is estimated by the bandwidth estimator, is a sum of an available bandwidth from each media provider to the media receiver.

After the transmission order is decided, in one of the embodiments, the media receiver notifies the media providers by adopting the following two methods. In the first method, the media receiver requests a frame or audio from each media provider first (wherein the data having higher importance is requested from the media provider having greater available bandwidth) and then requests data having the highest importance among the unrequested data from the provider which completes transmission first. For example, if there are two media providers A and B, wherein the media provider A has an available bandwidth greater than the media provider B, and an importance order of data is sorted as I1, P1, audio 1, P2, audio 2, B1, B2, B3 and B4. Accordingly, the media receiver requests I1 from the media provider A and P1 from the media provider B first. Given that the media provider B completes transmission earlier than the media provider A, the media receiver further requests the audio 1 from the media provider B. If the media provider A completes transmitting I1 during the media provider B still transmitting the audio 1 to the media receiver, the media receiver requests P2 from the media provider A.

In the second method, the media receiver assigns a frame or audio to each media provider (wherein the data having higher importance is assigned to the provider having greater available bandwidth), calculates the time of completing transmitting the assigned data according a predicted size of the assigned data and an estimated available bandwidth and then assigns data having the highest importance among the unrequested data to the provider which completes transmission first. After all data is already assigned, the media receiver transmits the assigned result to all media providers.

In the scenario 4, where there is a plurality of media providers, the structure of each GOP is known, and the media data are encoded by utilizing the encoding technique, such as the network coding, the network coding allows original data to be arbitrarily encoded and then transmitted to the media receiver without coordinating among the different media providers. Accordingly, in such scenario, the different media providers may be considered as one, and namely, the method for the media receiver and the providers to assign the importance in the scenario 4 is the same as the scenario 1.

In the scenario 5, where there is a plurality of media providers, the structure of each GOP is unknown, and the media data are not encoded by utilizing the encoding technique, such as the network coding, the media providers do not know about the operations of one another, and thus, to coordinate the order of transmitting the media data among one another is highly complicated. Accordingly, in the scenario, only the media receiver is allowed to decide the transmission order of the data according to the disclosure. First, the media receiver collects the status of the buffers respectively in each media provider and then, derives a union of data which the media receiver lacks according to the status of the buffers collected.

In one of the embodiments, the union of the lacking data may be selected by adopting one of the following two methods.

First, if no I-frame is contained in the lacking data union, the derived union is the current evaluation object collection, the download time of the latest P-frame in the current evaluation object collection minus the current time is configured as the available transmission time of the current evaluation object collection, and the assignment of importance and the sorting of transmission order of the current evaluation object are performed according to the type-urgency rule in the scenario 1.

Second, if at least one I-frame is contained in the lacking data union, the media data having the playback time prior to the oldest I-frame in the union are configured as the current evaluation object collection. The latest start download time of the oldest I-frame minus the current time is configured as the available transmission time of the current evaluation object collection, and the assignment of importance and the sorting of transmission order of the current evaluation object are performed according to the type-urgency rule in the scenario 1.

In the scenario 6, where there is a plurality of media providers, the structure of each GOP is unknown, and the media data are encoded by utilizing an encoding technique, such as the network coding. The detailed description of the scenario 6 is the same as the scenario 4, where the media providers may be considered as one. Accordingly, the detailed operation in the scenario 6 is the same as the scenario 2 (where there is a single media provider and the structure of each GOP is known, and will not be repeated hereinafter.)

The Method of Quick Playback

Figure 10A:
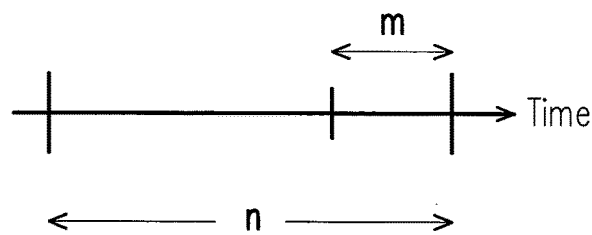
FIGS. 10A~10C are schematic diagrams illustrating processes of adopting a quick playback method to adapt to a network bandwidth according to the embodiments of the disclosure.

When the playback progress keeps up with the newest downloading progress (i.e. the buffer is exhausted) or the data amount temporarily stored in the buffer is lower than a first threshold, the timestamp regulator of the media receiver temporarily stores n time units of important encoded data and modifies the playback time information of the n time units of important encoded data. For example, the timestamp regulator modifies a timestamp field in the RTMP message header, such that at the last m time units within the n time units, the data is completely played by an acceleration (i.e. a speed in n/m times) so as to keep up with the newest progress. FIG. 10A illustrates that the encoded data is completely played within the last m time units in the period of the n time units.

During the period of the last m time unit, the timestamp regulator places the modified media data in the buffer according to the modified time information for the player to read. If under the P2P architecture, the modified data content is to be shared with other media receivers, and the timestamp restorer copies the media data and restores the playback time information before sharing.

The method of deciding the n and m values is described as follows.

When deciding the n value, the n value has to be long enough for downloading a certain amount of important encoded data (the importance is likewise defined as the important data defined by the method of downloading according to importance). The greatest value of n appears when the network returns to the smooth status so that the media receiver can download data at full bit rate. Since a pause of n-m time units is required for this method, the n value is adaptively not too great to avoid the user loses his/her patience. In an embodiment, a recommended value of the n value may be 2~20 seconds.

When deciding the m, a fixed ratio may be adopted, i.e. m=n/i, where i is a positive integer greater than 1, smaller than or equal to n. Alternatively, i may be a real number or any numeric that may be used to compare the degree of difference, which is applicable to the present embodiment and easier to implement. Besides, the m value may be adjusted according to the actual bandwidth. By the method of downloading according to importance, the number of frames that may be downloaded within the n time period is w, and further, the number of complete frames included in the stream within the n time period is r. Accordingly, m=n*w/r may be obtained. This rule may vary with the bandwidth, such that the playback speed may be as more approximate to the normal speed as possible. For example, the stream is played at 2 times the speed if w=r/2 and at 1.25 times the speed if w=4r/5.

Regarding the adjustment of the playback time information, the original scale of an interval between each frame may be considered to be maintained. For example, referring to FIG. 10B, if an original playback time of a frame is ti, and becomes tj after the adjustment, then $$t_j = (t_1 + n - m) + (t_i - t_1) \times \frac{m}{n}$$

Figure 10B:
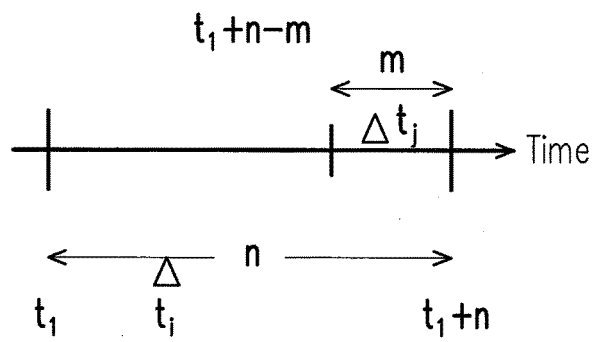

Otherwise, the scale of the interval between each frame becomes the same. Referring to FIG. 10B, if the number of the frames received within the former n-m time units is z, the rest m time units is divided into two parts, α and β, where α:β=(n-m):m. Then, the playback time of the z frames are evenly distributed in [t1+n-m, t1+n-m+α]. Therein, the rest m time units are considered as the original n time units, the β time length is considered as the original m time units, and by recursively performing the aforementioned steps until the divided β time length is smaller than a playback time of a frame played at a normal speed.

Figure 10C:
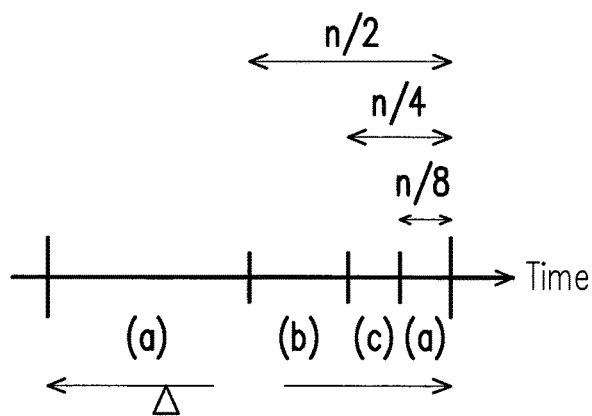

In an embodiment, referring to FIG. 10C, a dichotomy rule may also be adopted, by which the m value is controlled as a half of the n value. By recursively performing the step until the divided time length is smaller than a playback time of a frame played at a normal speed, for example, n/2, n/4 or n/8 as shown in FIG. 10C.

When performing the method of quick playback, the normal playback speed is restored when the data amount in the buffer is greater than a second threshold and the second threshold is greater than the first threshold.

Feasible Immediately Switch Method

According to one of the embodiments, a live media streaming method adapted to a dynamic network environment is introduced by the disclosure. In the method, first streaming data is received by using a first bit rate. When the network becomes stable, a second bit rate may be switched to receive second streaming data at a switch time. The switch time is obtained by determining according to a current playback time, a playback time of a first important encoding-decoding unit, a playback time of a second important encoding-decoding unit. The current playback time is the time of playing while determining the switch time. The playback time of the first important encoding-decoding unit is a playback time of the latest important encoding-decoding unit in a plurality of media data in the second streaming data having the playback time earlier than the current playback time among the second streaming data to be switched. The playback time of the second important encoding-decoding unit is a playback time of the oldest important encoding-decoding unit in a plurality of media data in the second streaming data having the playback time later than the current playback time among the second streaming data to be switched. The important encoding-decoding units are obtained by comparing with an importance parameter corresponding to a plurality of encoding-decoding units in each media data according to the information of the media data. In an embodiment, the important encoding-decoding units, such as the I-frames in the MPEG series or the I-slices in the H.263, H.264 and HEVC standards may be used to describe the method of the present embodiment. Hereinafter, the I-frames used in the MPEG series are illustrated in the present embodiment, but the disclosure is not limited thereto.

Figure 11A:
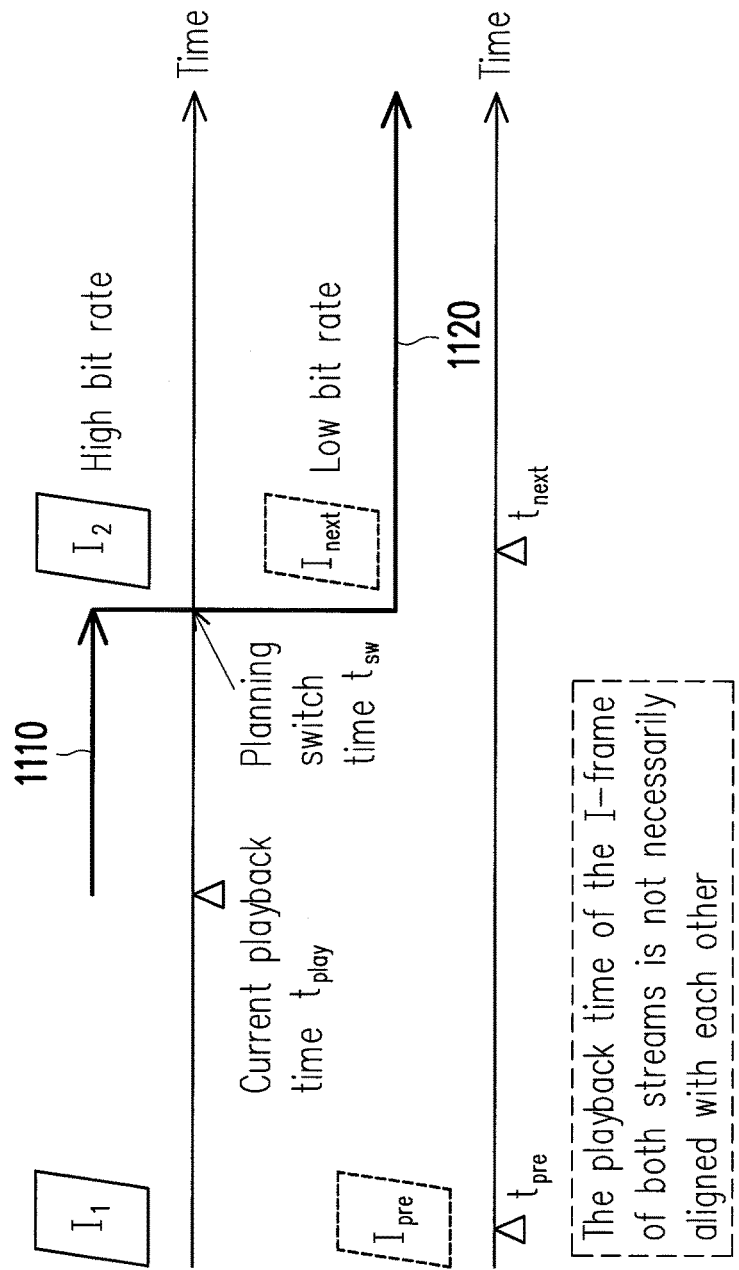
FIGS. 11A~11C are schematic diagrams illustrating processes of adopting a feasible immediate switch method to switch to a stream of a different streaming bit rate according to the embodiments of the disclosure.

Referring to FIG. 11A, when the network condition is stable, first streaming data (labeled as 1110) may be received at a first bit rate and a second bit rate may be switched to receive second streaming data (labeled as 1120) at a switch time. If it is assumed that the current playback progress is time $t_{play}$, the playback time of the newest one ($I_{pre}$) of the I-frames older than $t_{play}$ in the new stream is $t_{pre}$, the playback time of the oldest one ($I_{next}$) of the I-frames newer than $t_{play}$ in the new stream is $t_{next}$ and the possible switch time is $t_{sw}$, then $t_{play} < t_{sw} \leq t_{next}$.

Figure 11B:
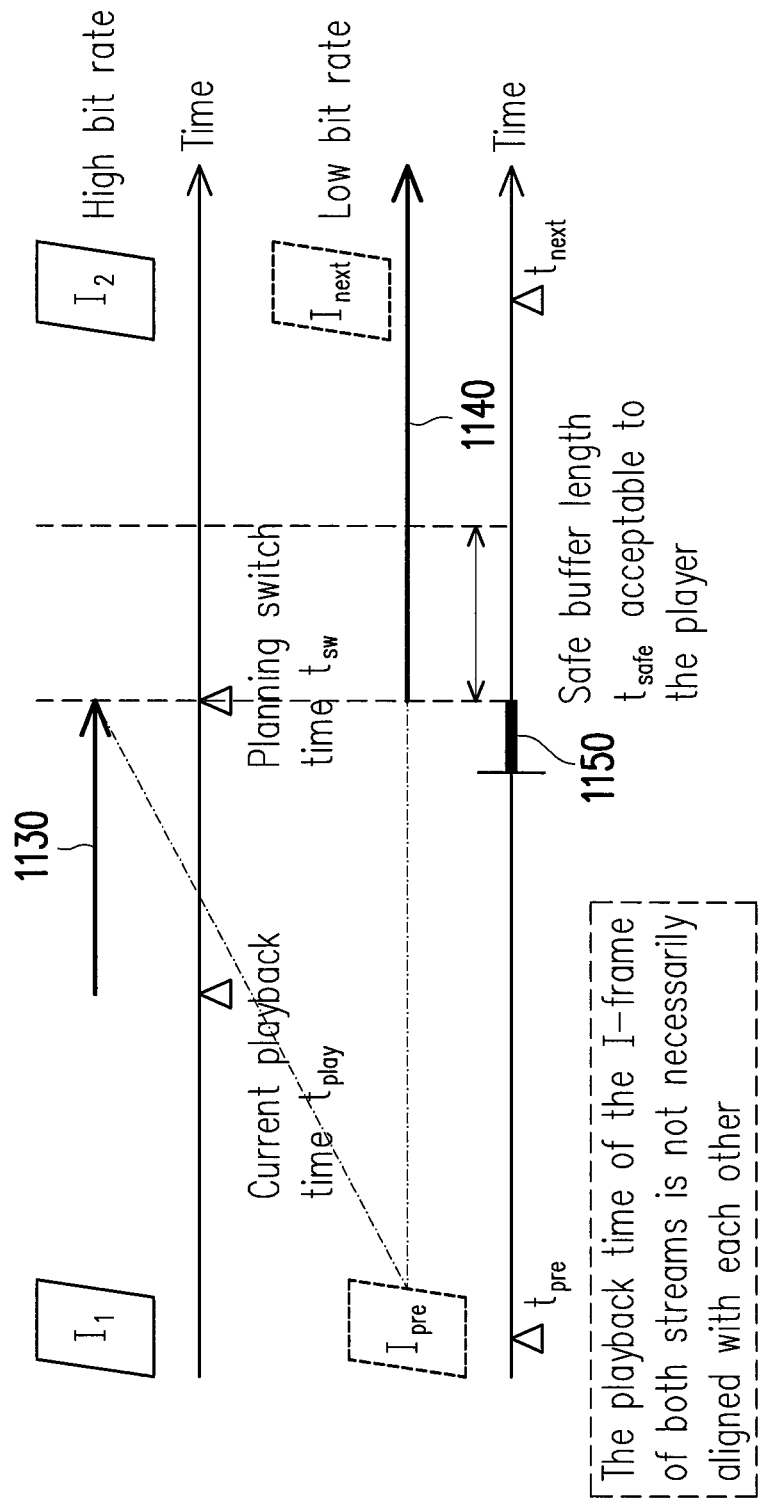

Referring to FIG. 11B, when the network condition is stable, first streaming data (labeled as 1130) may be received at a first bit rate and a second bit rate may be switched to receive second streaming data (labeled as 1140) at a switch time. If a safe buffer length accepted by the player is $t_{safe}$ time units, a sum of data amount in a new stream containing I and P frames within a $[t_{pre}, t_{sw})$ time interval, all data within a $[t_{sw}, t_{sw}+t_{safe}]$ time interval and all required decoding parameters (e.g. sequence parameter sets and picture parameter sets of the H.264 standard) is s, the available bandwidth from the media provider of the new stream to the media receiver is w, then the requirement to conform to $t_{sw} \leq t_{next}$ is $s/w \leq t_{sw} - t_{play} < t_{next} - t_{play}$. Therein, [ ] represents including while ( ) represents excluding. For example, an adopted time interval "[t1, t2]" represents a time interval which is greater than or equal to t1 and smaller than or equal to t2, while "[t1, t2)" represents a time interval which is greater than or equal to t1 and smaller than t2.

When a determination result is $t_{sw} < t_{next}$, the media receiver downloads the new stream containing the I and the P frames within the $[t_{pre}, t_{sw})$ time interval, all the data within the $[t_{sw}, t_{sw}+t_{safe}]$ time interval and all the required decoding parameters while watching the original stream. When the original stream is played pack to $t_{sw}$, the new stream is switched to at $t_{sw}$. By the above described quick playback technique, the playback time of the I and the P frames within the $[t_{pre}, t_{sw})$ time interval in the new stream is modified so that they are played within an interval of [the playback time of the previous frame of the frame which is played at $t_{sw}$, $t_{sw}$) (which is labeled as 1150). Thus, when another stream is switched to, the playback may directly continue from the current playback progress.

If the determination result is not possible to be $t_{sw} < t_{next}$, the original stream keeps being played, and until $t_{next}$, the new stream is switched to for being successively played and all the data within the $[t_{next}, t_{next}+t_{safe}]$ time interval and all the required decoding parameters in the new stream are already downloaded before switching.

In several embodiments, the methods of determining the switch time $t_{sw}$ include at least two.

If $t_{next} - t_{play} \leq$ a specific threshold, a brute force algorithm may used to determine whether $s/w \leq t_{sw} - t_{play} < t_{next} - t_{play}$ is satisfied when $t_{sw}$ is the playback time of a frame within the time interval $[t_{play}, t_{next})$, the smallest value satisfying the requirement is the $t_{sw}$ as required.

Figure 11C:
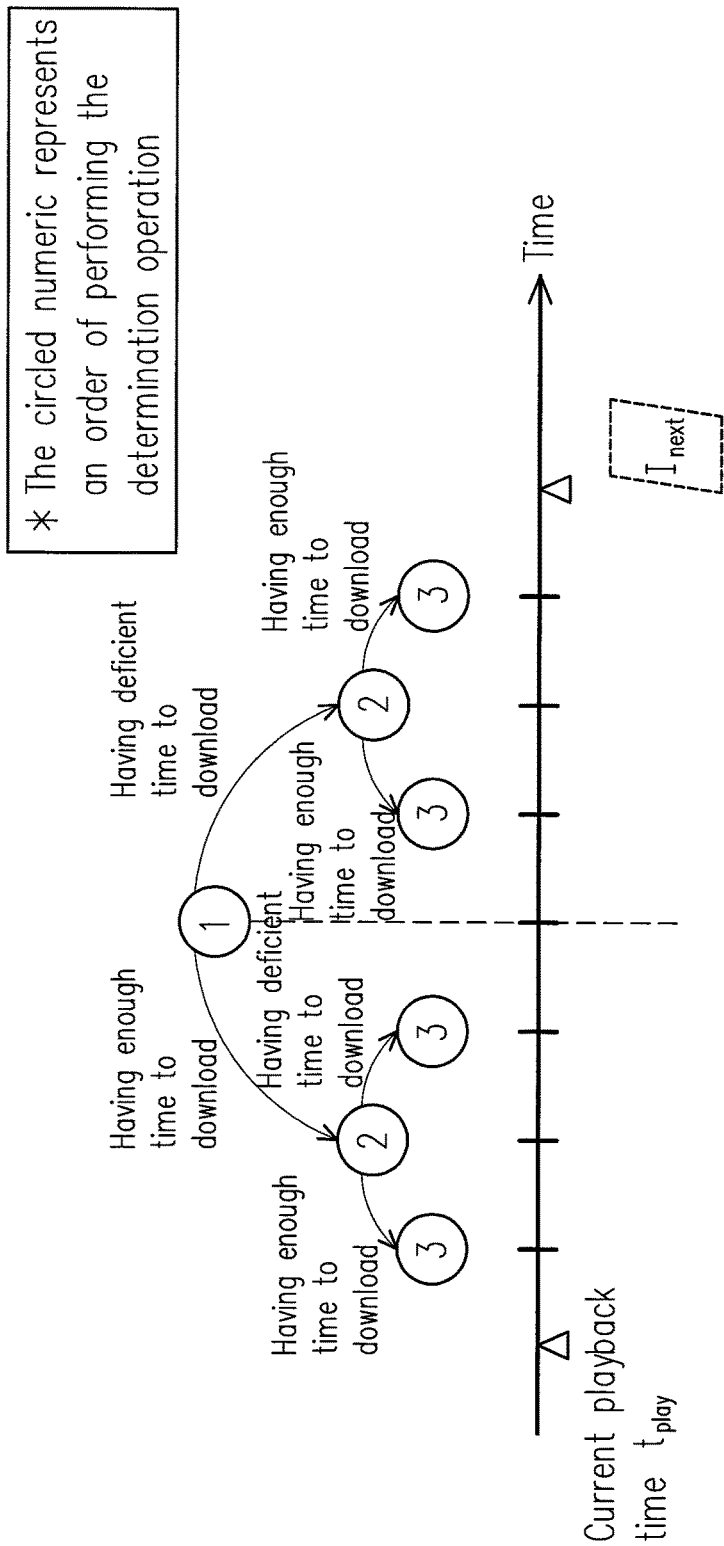

If $t_{next} - t_{play} >$ a specific threshold, a binary-search algorithm may used for the determination. Namely, a middle point $t_m$ is gotten from the $[t_{play}, t_{next})$ time interval first, $t_{sw} = t_m$ is given, and if $s/w \leq t_{sw} - t_{play} < t_{next} - t_{play}$, then the original range is replaced by the left portion of the current $t_m$. Otherwise, if $s/w > t_{sw} - t_{play}$, the original range is replaced by the right portion of the current $t_m$. The aforementioned process of getting the middle point and determining is recursively performed until an interval between two gotten middle points is smaller than a threshold or a playback time of a frame, the process is stopped. The last determination result is the switch time as requested. Referring to FIG. 11C for the determination method by using the binary-search algorithm, the middle point $t_m$ is gotten, if having enough time to download, a half of the left portion is further gotten, then whether time to download is enough is determined, and the process of getting the middle point and determining is recursively performed.

Among the six scenarios adapted to the method of downloading according to the importance order, the process of determining and deciding the switch time $t_{sw}$ may be performed in either the media provider or the receiver in the scenarios 1 and 4. In the scenario 3, the calculation of the switch time $t_{sw}$ is only allowed to be performed in the media receiver in the disclosure so as to avoid complicated design of mutual communication between each media provider. The calculation of the switch time $t_{sw}$ is to evaluate whether the data for quick playback may be completely downloaded with a limited time period by the method of downloading according to importance. As for other scenarios, since the structure of each GOP is unknown, the calculation of the switch time $t_{sw}$ may be calculated until the media provider of the new stream discovers $I_{next}$. In this case, the calculation by the media provider may obtain the result quicker in the scenarios 2 and 6, while in the scenario 5, the calculation is only allowed to be performed in the media receiver in the disclosure so as to avoid complicated design of mutual communication between each media provider.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A media streaming method, comprising:
    receiving, by a media streaming device, streaming data from a media provider;
    monitoring and temporarily storing, by the media streaming device, a first plurality of encoded data obtained from the streaming data in a memory device of the media streaming device, wherein each of the first plurality of encoded data comprises a plurality of encoding-decoding units, wherein each of the first plurality of encoded data comprises media data or only image data, wherein a streaming adjustment event is started as a result of monitoring the first plurality of encoded data temporarily stored in the memory device;
    wherein the streaming adjustment event comprises:
        obtaining information of the first plurality of encoded data,
        according to the obtained information of the first plurality of encoded data, obtaining, by the media streaming device, an importance parameter corresponding to a plurality of encoding-decoding units of a second plurality of encoded data to be received from the media provider, wherein the plurality of encoding-decoding units of the second plurality of encoded data comprises a first encoding-decoding unit and a second encoding-decoding unit, and the importance parameter indicates that the first encoding-decoding unit is arranged to be transmitted in a first position in a transmission order of the plurality of encoding-decoding units of the second plurality of encoded data, and the second encoding-decoding unit is arranged to be transmitted at a second position in the transmission order;
        modifying the importance parameter by exchanging importance of at least two encoding-decoding units of the second plurality of encoded data; and
        sending an adjustment signal comprising the modified importance parameter to the media provider to arrange the first encoding-decoding unit to be transmitted at the second position in the transmission order and arrange the second encoding-decoding unit to be transmitted at the first position in the transmission order according to the modified importance parameter before transmitting the second plurality of encoded data to the media streaming device, wherein the second plurality of encoded data is part of the streaming data subsequent to the first plurality of encoded data.

2. The media streaming method according to claim 1, wherein the step of monitoring and temporarily storing the first plurality of encoded data obtained from the streaming data in a memory device of the media streaming device comprises:

determining whether an amount of the first plurality of encoded data temporarily stored in the memory device is lower than a first threshold or higher than a second threshold, wherein the second threshold is higher than the first threshold;

when the amount of the first plurality of encoded data temporarily stored in the memory device is lower than the first threshold, starting the streaming adjustment event according to the importance parameter; and when the amount the first plurality of encoded data is higher than the second threshold, stopping the streaming adjustment event.

3. The media streaming method according to claim 1, wherein the information of the first plurality of encoded data comprises group of picture (GOP) information of the first plurality of encoded data, a playback time of the first plurality of encoded data which is evaluated, a predicted size of data, a predicted decoding time, an available bandwidth, an number of sources providing the first plurality of encoded data and whether the first plurality of encoded data adopts a network coding technique.

4. The media streaming method according to claim 1, wherein the plurality of encoding-decoding units comprises a feature of mutual reference and correlation.

5. The media streaming method according to claim 1, wherein the plurality of encoding-decoding units comprises I-frames, P-frames and B-frames conforming to the Motion Picture Experts Group (MPEG) standard.

6. The media streaming method according to claim 1, wherein the plurality of encoding-decoding units comprises I, P and B slices conforming to the H.263, H.264, or HEVC standard.

7. The media streaming method according to claim 1, wherein the importance parameter corresponding to the plurality of encoding-decoding units comprised in each of the media data is determined and specified according to a type of the plurality of encoding-decoding units.

8. The media streaming method according to claim 7, wherein the importance parameter corresponding to the plurality of encoding-decoding units comprised in each of the media data is further specified according to an urgency of the plurality of encoding-decoding units.

9. The media streaming method according to claim 7, wherein the importance parameter corresponding to the plurality of encoding-decoding units comprised in each of the media data is further adjusted according to an additionally specified requirement.

10. The media streaming method according to claim 7, wherein the importance parameter corresponding to the plurality of encoding-decoding units comprised in each of the media data is further specified according to an urgency and an additionally specified requirement.

11. The media streaming method according to claim 1, wherein the importance parameter corresponding to the plurality of encoding-decoding units comprised in each of the media data is evaluated by configuring either one or multiple GOPs or a portion of the GOP of the plurality of encoded data as an evaluation object collection.

12. The media streaming method according to claim 11, wherein before evaluating the evaluation object collection, a latest start download time of a next evaluation object collection is obtained to obtain an available download time of the evaluation object collection.

13. A media streaming device, adapted to receive streaming data comprising a first plurality of encoded data from a media provider, each of the first encoded data comprises a plurality of encoding-decoding units, and the plurality of encoding-decoding units is transmitted to a player according to an encoding order, wherein the first plurality of encoded data comprises media data or only image data, the media streaming device comprising:

a buffer, temporarily storing the first plurality of encoded data; and a processor, coupled to the buffer, and configured to execute:

obtaining information of the first plurality of encoded data and monitoring an amount of the first plurality of encoded data temporarily stored in the buffer;

obtaining an importance parameter corresponding to a plurality of encoding-decoding units of a second plurality of encoded data to be received from the media provider, wherein the second plurality of encoded data is part of the streaming data subsequent to the first plurality of encoded data, and the plurality of encoding-decoding units of the second plurality of encoded data comprises a first encoding-decoding unit and a second encoding-decoding unit, wherein the importance parameter indicates that the first encoding-decoding unit is arranged to be transmitted from the media provider at a first position in a transmission order of the plurality of encoding-decoding units of the second plurality of encoded data, and the second encoding-decoding unit is arranged to be transmitted at a second position in the transmission order;

modifying the importance parameter by exchanging importance of the first and second encoding-decoding units, and transmitting an adjustment signal when the amount of the plurality of encoded data is lower than a first threshold; and transmitting an adjustment stopping signal when the amount of the plurality of encoded data is higher than a second threshold;

outputting a frame request signal comprising the modified importance parameter to the media provider to arrange the first encoding-decoding unit to be transmitted at the second position in the transmission order and arrange the second encoding-decoding unit to be transmitted at the first position in the transmission order according to the modified importance parameter before transmitting the second plurality of encoded data to the media streaming device in response to the adjustment signal so as to adjust the transmission order of the plurality of encoding-decoding units of the second plurality of encoded data in the streaming data.

14. The media streaming device according to claim 13, wherein the importance parameter corresponding to the plurality of encoding-decoding units is calculated and obtained according to and a part of or a combination of GOP information of the plurality of encoded data, a number of sources providing the second plurality of encoded data, whether the second plurality of encoded data adopts a network coding technique, a playback time of the second plurality of encoded data, a predicted size of data, a predicted decoding time and an available bandwidth.

15. The media streaming device according to claim 13, wherein the frame request signal comprises a combination of all of or a part of an available network bandwidth, a current play back progress and a buffer status.

16. The media streaming device according to claim 13, wherein the processor is further configured to execute receiving the second plurality of encoded data, temporarily storing the second plurality of encoded data in the buffer and modifying the playback time of a portion of the second plurality of encoded data.

17. The media streaming device according to claim 16, wherein the processor is further configured to execute outputting a bit rate request signal in response to the adjustment signal and a bandwidth estimation result to provide information of the encoded data to switch to and receiving another streaming data of a different bit rate.

18. The media streaming device according to claim 13, wherein the processor is further configured to execute:
transmitting the first plurality of encoded data received from the streaming data; and
receiving another frame request signal received from an external device, wherein the another frame request signal comprising:
an importance parameter corresponding to a plurality of encoding-decoding units of the second plurality of encoded data to be transmitted to the external device; and
adjusting a transmission order of the plurality of encoding-decoding units of the second plurality of encoded data to be transmitted to the external device according to the importance parameters.

19. The media streaming device according to claim 18, wherein the importance parameter corresponding to the plurality of encoding-decoding units of the second plurality of encoded data is calculated and obtained according to a part of or a combination of GOP information of the first plurality of encoded data, an number of sources providing the first plurality of encoded data, whether the first plurality of encoded data adopts a network coding technique, a playback time of the first plurality of encoded data, a predicted size of data, a predicted decoding time, an available bandwidth.

20. The media streaming device according to claim 18 wherein the processor is further configured to execute:
receiving the second plurality of encoded data, temporarily storing the second plurality of encoded data in the buffer and modifying the playback time of a portion of the second plurality of encoded data; and
restoring the modified playback time to adapt to a timestamp of media streaming information to be used by media receiver at a next stage.

21. The media streaming device according to claim 20 wherein the processor is further configured to execute:
outputting a bit rate request signal in response to the adjustment signal and a signal from a bandwidth estimator to provide information of the encoded data to switch to and receive another streaming data of a different bit rate; and
receiving another bit rate request signal from the external device, switching from first streaming data having a first bit rate to second streaming data having a second bit rate and determining to start to transmit the second streaming data from an acceptable playback time point.

22. A media streaming device, comprising:
a memory device;
a processor, coupled to the memory device, and configured to execute:
transmitting first streaming data having a first bit rate, wherein the first streaming data comprises a first plurality of encoded data, each of the first plurality of encoded data comprises a plurality of encoding-decoding units, the plurality of encoding-decoding units are transmitted, wherein the encoded data comprises media data or only image data;
arranging a plurality of encoding-decoding units of a second plurality of encoded data of the first streaming data, wherein a first encoding-decoding unit of the second plurality of encoded data is to be transmitted at a first position in a transmission order of the plurality of encoding-decoding units of the second plurality of encoded data, and a second encoding-decoding unit of the second plurality of encoded data is to be transmitted at a second position in the transmission order,
after transmitting the first plurality of encoded data and before transmitting the second plurality of encoded data, receiving a frame request signal from an external device, wherein the frame request signal comprises an importance parameter corresponding to the plurality of encoding-decoding units of a second plurality of encoded data, and according to the importance parameter, transmitting the first encoding-decoding unit of the second plurality of encoded data at the second position in the transmission order and the second encoding-decoding unit of the second plurality of encoded data at the first position in the transmission order.

23. The media streaming device according to claim 22, wherein the importance parameter of the plurality of encoding-decoding units of the second plurality of encoded data is calculated and obtained according to a part of or a combination of GOP information of the first plurality of encoded data, an number of sources providing the first plurality of encoded data, whether the first plurality of encoded data adopts a network coding technique, a playback time of the first plurality of encoded data, a predicted size of data, a predicted decoding time, an available bandwidth.

24. The media streaming device according to claim 22, wherein the processor is further configured to execute:
receiving a bit rate request signal from the external device, switching from outputting the first streaming data having the first bit rate to outputting second streaming data having a second bit rate and determining to start to transmit the second streaming data from an acceptable playback time point.

* * * * *